(12) United States Patent
Shapshal

(10) Patent No.: US 12,327,258 B2
(45) Date of Patent: *Jun. 10, 2025

(54) FORMING, AUTHENTICATING AND SECURING NON-FUNGIBLE ITEMS

(71) Applicant: Elite Coinage Co., Boca Raton, FL (US)

(72) Inventor: Yury Shapshal, Boca Raton, FL (US)

(73) Assignee: Elite Coinage Co., Boca Raton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/588,317

(22) Filed: Feb. 27, 2024

(65) Prior Publication Data

US 2024/0193621 A1    Jun. 13, 2024

Related U.S. Application Data

(63) Continuation of application No. 17/895,164, filed on Aug. 25, 2022, now Pat. No. 12,175,479.

(60) Provisional application No. 63/236,696, filed on Aug. 25, 2021.

(51) Int. Cl.
| | |
|---|---|
| *G06Q 30/018* | (2023.01) |
| *G06K 19/06* | (2006.01) |
| *G07D 5/00* | (2006.01) |
| *G07D 7/00* | (2016.01) |
| *G07D 7/0047* | (2016.01) |
| *G07D 7/005* | (2016.01) |
| *G07D 7/12* | (2016.01) |
| *G07D 7/20* | (2016.01) |

(52) U.S. Cl.
CPC ..... *G06Q 30/0185* (2013.01); *G06K 19/0614* (2013.01); *G07D 5/005* (2013.01); *G07D 7/0032* (2017.05); *G07D 7/0034* (2017.05); *G07D 7/0047* (2017.05); *G07D 7/005* (2017.05); *G07D 7/12* (2013.01); *G07D 7/2016* (2013.01)

(58) Field of Classification Search
CPC .......... G06Q 30/0185; G06K 19/0614; G07D 5/005; G07D 7/0032; G07D 7/0034; G07D 7/0047; G07D 7/005; G07D 7/12; G07D 7/2016
See application file for complete search history.

(56) References Cited

U.S. PATENT DOCUMENTS

2005/0069171 A1* 3/2005 Rhoads ............... G07D 7/0034
382/100

* cited by examiner

*Primary Examiner* — Christopher Wait
(74) *Attorney, Agent, or Firm* — Morgan Lewis & Bockius LLP

(57) ABSTRACT

Embodiments relate to a non-fungible physical (NFP) item. The non-fungible physical (NFP) item comprises an identifier. The identifier is embedded and layered within the non-fungible physical item in an unplanned pattern. The identifier in the unplanned pattern is configured to provide high security against counterfeiting of the non-fungible physical (NFP) item. The identifier comprises at least one of a random marker and a unique marker. The unplanned pattern comprises at least one of a random pattern and a unique pattern. Further the non-fungible physical (NFP) item is registered as a non-fungible token on a blockchain. The NFP item is then paired with the non-fungible token for enabling two-way mutual authentication and enhanced authenticity. The pairing of the NFP item with the non-fungible token enables tracking condition, provenance, and grading of the NFP item.

11 Claims, 8 Drawing Sheets

408 A-N

FORMING, AUTHENTICATING AND SECURING NON-FUNGIBLE ITEMS

CROSS-REFERENCE TO RELATED APPLICATIONS

The present application is a continuation application of U.S. Non-Provisional application Ser. No. 17/895,164, filed on Aug. 25, 2022, which claims the benefit under 35 U.S.C § 119 of U.S. Provisional Application No. 63/236,696, filed on Aug. 25, 2021, which is hereby incorporated by reference in its entirety. The present application is further related to U.S. Non Provisional application Ser. No. 17/895,179, filed on Aug. 25, 2022 titled "METHOD AND SYSTEM FOR PROTECTION AGAINST COUNTERFEITING." U.S. patent applications referred above are incorporated, for the purposes of written description, herein by reference in their entirety.

FIELD OF THE INVENTION

The invention generally relates to the field of anti-counterfeiting and more particularly relates to a production and pairing of a non-fungible physical (NFP) item with a uniquely registered digital representation of the same item via a secure, and mutual authentication.

BACKGROUND

As of 2018, counterfeiting is the largest criminal enterprise in the world, with domestic and international sales of counterfeit and pirated goods totalling between an estimated $1.7 trillion and $4.5 trillion a year—a higher amount than cither drugs or human trafficking. [Source: Wade Shepard, "Meet the Man Fighting America's Trade War against Chinese Counterfeits (It's Not Trump)," Forbes, Mar. 29, 2018, https://www.forbes.com/sites/wadeshepard/2018/03/29/mect-the-man-fighting-americas-trade-war-against-chinese-counterfeits/#db934f51c0d6; and Roberto Fontana, Stéphane J. G. Girod, and Martin Králik, "How Luxury Brands Can Beat Counterfeits," Harvard Business Review, May 24, 2019, https://hbr.org/2019/05/how-luxury-brands-can-beat-counterfeiters].

Around 80 percent of these goods are produced in China, and 60 percent to 80 percent of those products are purchased by Americans. [Source; Shepard, "Meet the Man"; Mar. 29, 2018; https://www.forbes.com/sites/wadeshepard/2018/03/29/meet-the-man-fighting-americas-trade-war-against-chinese-counterfeits/?sh=6cd8431a1c0d].

Over the years, a variety of organizations have attempted to estimate the size of the international counterfeit market. Those figures range from a low of $200 billion in 2008 to a high of $509 billion in 2019. [Source: Organisation for Economic Co-operation and Development (OECD) and European Union Intellectual Property Office (EUIPO), "Trade in Counterfeit and Pirated Goods: Mapping the Economic Impact" (Paris: OECD Publishing, 2016), 68, doi: 10.1787/9789264252653-en; OECD and EUIPO, Trends in Trade in Counterfeit and Pirated Goods (Paris: OECD Publishing, 2019), 45, doi: 10.1787/g2g9f533-en.]

"Counterfeit consumer goods (or counterfeit and fraudulent, suspect items—CFSI) are goods, often of inferior quality, made or sold under another's brand name without the brand owner's authorization. Sellers of such goods may infringe on either the trademark, patent, or copyright of the brand owner by passing off its goods as made by the brand owner. Counterfeit products made up 5 to 7% of world trade in 2013, and in 2014 cost an estimated 2.5 million jobs worldwide, with up to 750,000 jobs lost in the U.S. About 5% of goods imported into the European Union in 2013 were fakes, according to the OECD". [Source: Counterfeit consumer goods; published on Wikipedia]

"Counterfeiting and piracy are highly pervasive across countries and sectors, representing a multi-Billion-dollar industry globally that continues to grow. Measuring the scale of counterfeiting and piracy helps us to understand the size of the problem, and the related social costs. It also helps inform policymakers so that they can target resources appropriately towards combating counterfeiting and piracy." [Source: The Economic Impacts of Counterfeiting and Piracy-Report prepared for BASCAP and INTA].

"Today, it takes one click to buy an airline ticket or a new sweater, but if you want to buy stocks or get a mortgage, transactions are more time intensive. Whether it is waiting for documents or settlement, many types of transactions aren't instant. Assets like gold, real estate, fine art, or carbon credits are more difficult to transfer, often obligating buyers and sellers to contend with mountains of paperwork and lengthy procedures. By representing physical assets as digital tokens on a distributed digital ledger or blockchain, it is possible to unlock the value of real-world assets and to exchange them in real time. Digitization of assets is a process in which the rights to an asset are converted into a digital token on a blockchain. Ownership rights are transmitted and traded on a digital platform, and the real-world assets on the blockchain are represented by digital tokens." [Source: The digitization of real-world assets into tokens on blockchain; Jesse Lund; Shanker Ramamurthy; and Bridget van Kralingen]

There is a current need to address the shortcomings in the prior art and provide a system and a method that convenes for production and pairing of a non-fungible physical (NFP) item with a uniquely registered digital representation. It would be advantageous to have an apparatus that considers at least some of the issues discussed above, as well as possibly other issues.

SUMMARY

In an aspect, a non-fungible physical (NFP) item is described. The non-fungible physical (NFP) item comprises an identifier embedded and layered within the non-fungible physical item in an unplanned pattern. The identifier in the unplanned pattern is configured to provide high security against counterfeiting of the non-fungible physical (NFP) item. The identifier comprises at least one of a random marker and a unique marker. The unplanned pattern comprises the identifier in the NFP item in at least of a random pattern and a unique pattern.

In an embodiment, the identifier comprises at least one of or a combination of: a holographic foil; a watermark; a unique serial identification (ID) number; a plurality of fibers; an intaglio border; and an authenticating feature.

In another embodiment, the plurality of fibers comprises invisible fibers.

In yet another embodiment, the plurality of fibers comprises visible fibers.

In yet another embodiment, the unique serial identification (ID) number is floating within a frame of the non-fungible physical (NFP) item.

In yet another embodiment, at least one of a location, a size, a shape, and a position of the unique serial identification (ID) number in the non-fungible physical (NFP) item is unique.

In yet another embodiment, the non-fungible physical (NFP) item comprises a reference point.

In yet another embodiment, the reference point is adapted to authenticate the non-fungible physical (NFP) item.

In yet another embodiment, the reference point is adapted to estimate a condition of the non-fungible physical (NFP) item over a course of time.

In yet another embodiment, the watermark comprises a Fourdrinier watermark.

In yet another embodiment, the holographic foil comprises a variable edge.

In yet another embodiment, the holographic foil comprises a plurality of security features embedded within the holographic foil.

In yet another embodiment, the holographic foil comprises at least one of a guilloche fine line, a morphing effect, a flip image, a laser-viewable image, a micro image, a lens effect, an intentional error, a micro text, and a nano text.

In yet another embodiment, the non-fungible physical (NFP) item comprises a multi-layered item.

In yet another embodiment, the non-fungible physical (NFP) item comprises a predefined thickness adapted for performing a digital printing using the non-fungible physical (NFP) item as a medium.

In yet another embodiment, the non-fungible physical (NFP) item comprises one of a trading card, a comic book, a collectible coin, a work of art, a legal document, a label, and a holder.

In yet another embodiment, a holder is adapted to hold the non-fungible physical (NFP) item.

In yet another embodiment, the holder comprises one of a transparent holder and a non-transparent holder.

In yet another embodiment, the non-fungible physical (NFP) item comprises a predefined thickness adapted for performing digital printing with variable data.

In yet another embodiment, the digital printing on the non-fungible physical (NFP) item enhances security against the counterfeiting by combining the variable data with the identifier.

In yet another embodiment, a work of art is created on the non-fungible physical (NFP) item with a different medium, wherein the different medium comprises at least one of an acrylic, a watercolor, an oil, pastels, a gouache, a pencil, a charcoal, a crayon, an enamel, a prisma color, an art marker, a highlighter, a marker, a paint, or an ink.

In yet another embodiment, the art of work on the different medium comprise a high value based on rarity on a medium.

In yet another embodiment, the non-fungible physical (NFP) item is retrofitted to a fungible item to convert the fungible item to a non-fungible item.

In yet another embodiment, the non-fungible item comprises a combination of at least one of a label, a holder, and the fungible item. The label and/or the holder comprises the identifier (i.e., at least one of the random marker and the unique marker) embedded and layered in the unplanned pattern.

In yet another embodiment, the fungible item comprises one of a collectible item, a legal document, a work of art, a sticker, a painting, a sculpture.

In yet another embodiment, the non-fungible physical item comprises a plurality of zones, wherein each zone of the plurality of zones comprise the unplanned pattern to provide high security against counterfeiting.

In yet another embodiment, the non-fungible physical item comprises a combination of at least one of a label and a holder is retrofitted to a relic to form a secure pod.

In yet another embodiment, the secure pod comprises a place holder to hold a fungible item.

In yet another embodiment, the non-fungible physical item comprises a lamination.

In yet another embodiment, the non-fungible physical item comprises an intaglio border over the lamination.

In yet another embodiment, the lamination enables a Fourdrinier watermark to be visible over a surface of the non-fungible physical item against a reflection of a light source.

In yet another embodiment, the non-fungible physical item renders a Fourdrinier watermark to be visible over a surface of the non-fungible physical item against a reflection of a light source when a digital ink is placed over the non-fungible physical item.

In yet another embodiment, the intaglio border comprises one of a micro-text and a nano-text within the intaglio border.

In an embodiment, the intaglio border comprises a stereoscopic element within the NFP item which provides illusion of 3D space as another identifier.

In yet another embodiment, the authenticating feature is embedded into a multi-layered item of the non-fungible physical item.

In another embodiment, a system is described herein. The system comprises an authentication device. The authentication device comprises a sensor; and a backlight unit. The authentication device is configured to verify authenticity of a non-fungible physical (NFP) item comprising an identifier embedded and layered within the non-fungible physical (NFP) item in an unplanned pattern. The identifier comprises at least one of a random marker and a unique marker. The unplanned pattern comprises the identifier in the NFP item in at least of a random pattern and a unique pattern.

In an embodiment, the authentication device comprises one of an electronic device, a mobile phone, a tablet, a personal digital assistant, a computer, a laptop, and a desktop.

In another embodiment, the sensor is configured to capture an image of the non-fungible physical (NFP) item.

In yet another embodiment, the sensor comprises a camera.

In yet another embodiment, the authentication device comprises a scanner and/or optical reader.

In yet another embodiment, the authentication device is configured to verify authenticity of the non-fungible physical (NFP) item and provide certification, offline.

In yet another embodiment, the authentication device is configured to communicate with a server and verify authenticity of the non-fungible physical (NFP) item and provide certification, through an internet connection.

In yet another embodiment, the authentication device is configured to create a digital file of the non-fungible physical (NFP) item.

In yet another embodiment, the digital file comprises a digital form of the non-fungible physical (NFP) item.

In yet another embodiment, the digital file further comprises a first unplanned pattern information of the non-fungible physical (NFP) item.

In yet another embodiment, the first unplanned pattern information comprises a location, a position, a shape, a size, a color, a pattern, a reference point, and a dimension of the identifier with respect to the non-fungible physical (NFP) item.

In yet another embodiment, the authentication device is configured to communicate and register the digital form of the non-fungible physical (NFP) item as a non-fungible token (NFT) onto a blockchain.

In yet another embodiment, the authentication device is configured to register the digital file with a third-party grading and authentication service on a blockchain for verification and certification.

In yet another embodiment, the digital file registered with a third-party grading and authentication service is used as a reference to authenticate, determine condition, and provenance of the non-fungible physical (NFP) item in future.

In yet another embodiment, the authentication device is configured to pair the non-fungible physical (NFP) item with the non-fungible token (NFT) using the identifier through a secured link.

In yet another embodiment, the secured link is adapted to mutually authenticate in two-way between the non-fungible physical (NFP) item and the non-fungible token (NFT).

In yet another embodiment, the authentication device comprises an artificial intelligence unit.

In yet another embodiment, the authentication device is configured to verify the authenticity of the non-fungible physical (NFP) item by: scanning an image of the non-fungible physical (NFP) item; extracting, via an artificial intelligence unit, a second unplanned pattern information of the identifier; comparing the second unplanned pattern information with a first unplanned pattern information; and verifying, via the artificial intelligence unit, the authenticity of the non-fungible physical (NFP) item based on the comparison.

In yet another embodiment, the authentication device is further configured to compare the second unplanned pattern information with the first unplanned pattern information to determine individual varied degree of security level of the non-fungible physical (NFP) item over a course of time; and provide a grading to the non-fungible physical (NFP) item based on the individual varied degree of security level and the authenticity verified via the artificial intelligence unit.

In yet another embodiment, the authentication device is configured with a mobile application.

In yet another embodiment, the authentication device is configured to define and enforce rules with respect to a smart contract on a blockchain for one of licensing and sale of the NFP item and NFT.

In yet another embodiment, the digital form of the non-fungible physical (NFP) item comprises a plurality of segments. The plurality of segments are registered as a plurality of non-fungible tokens on the blockchain.

In yet another embodiment, a segment of the plurality of segments comprise the unplanned pattern to provide high security against counterfeiting.

In yet another embodiment, the authentication device, via an artificial intelligence unit, matches the segment with the digital form and determines a location, a position, a shape, a size, and a color of the segment.

In an aspect, a method is described. The method comprises embedding and layering an identifier within a non-fungible physical item in an unplanned pattern. The identifier in the unplanned pattern is configured to provide high security against counterfeiting of the non-fungible physical (NFP) item. The identifier comprises at least one of a random marker and a unique marker. The unplanned pattern comprises the identifier in at least of a random pattern and a unique pattern.

In an embodiment, embedding and layering the identifier within the non-fungible physical item in the unplanned pattern comprises: infusing a metal into an intaglio border of a first portion of the non-fungible physical item. In another embodiment, infusing the metal into the intaglio border of the first portion of the non-fungible physical item comprises: embedding at least one of a negative and a positive microtext into the intaglio border.

In an embodiment, embedding and layering the identifier within the non-fungible physical item in the unplanned pattern comprises: embedding a holographic foil comprising a variable edge into a second portion of the non-fungible physical item. The holographic foil comprises a plurality of security features. The plurality of security features comprises at least one of a guilloche fine line, a morphing effect, a flip image, a laser-viewable image, a micro image, a lens effect, an intentional error, a micro text, and a nano text.

In another embodiment, embedding and layering the identifier within the non-fungible physical item in the unplanned pattern comprises: embedding a watermark into a front side and a back side of the non-fungible physical item.

In yet another embodiment, embedding and layering the identifier within the non-fungible physical item in the unplanned pattern comprises: randomly dispersing a plurality of fibers in the unplanned pattern in the non-fungible physical item. The plurality of fibers comprises at least one visible fiber or at least one invisible fiber.

In yet another embodiment, embedding and layering the identifier within the non-fungible physical item in the unplanned pattern comprises: embedding an authentication feature into a multi-layered item of the non-fungible physical item.

In yet another embodiment, embedding and layering the identifier within the non-fungible physical item in the unplanned pattern comprises: embedding a multi-color offset into a multi-layered item of the non-fungible physical item.

In yet another embodiment, embedding and layering the identifier within the non-fungible physical item in the unplanned pattern comprises: printing a unique serial identification (ID) number within a floating frame of the non-fungible physical item.

In yet another embodiment, the method further comprises: capturing a random uniqueness of the non-fungible physical item in a digital file, wherein the digital file comprises a digital form of the non-fungible physical item; and registering the digital form of the non-fungible physical item as a non-fungible token (NFT) onto a blockchain.

In yet another embodiment, the method further comprises: pairing the non-fungible physical (NFP) item with the non-fungible token (NFT) using the identifier through a secured link. In yet another embodiment, the method further comprises: mutually authenticating in two-way between the non-fungible physical (NFP) item and the non-fungible token (NFT).

In yet another embodiment, the method further comprises: verifying authenticity of the non-fungible physical (NFP) item using an authentication device. In yet another embodiment, verifying the authenticity of the non-fungible physical (NFP) item using the authentication device comprises: scanning an image of the non-fungible physical (NFP) item; extracting, via an artificial intelligence unit, a second unplanned pattern information of the identifier; comparing the second unplanned pattern information with a first unplanned pattern information of the digital form; and verifying, via the artificial intelligence unit, the authenticity of the non-fungible physical (NFP) item based on the comparison.

In yet another embodiment, the method further comprises: determining individual varied degree of security level of the non-fungible physical (NFP) item over a course of time based on the comparison; and provide a grading to the non-fungible physical (NFP) item based on the individual varied degree of security level and the authenticity verified via the artificial intelligence unit.

In yet another embodiment, the method further comprises: defining and enforcing rules with respect to a smart contract on a blockchain for one of licensing and sale of the NFP item and NFT.

In yet another embodiment, the method further comprises: manufacturing the NFP item comprising a predefined thickness adapted for performing a digital printing on the non-fungible physical (NFP) item. Digital printing on the non-fungible physical (NFP) item creates an art of work on a different medium.

In yet another embodiment, the method further comprises: retrofitting the non-fungible physical (NFP) item to a fungible item to convert the fungible item to a non-fungible item, wherein the non-fungible item comprises a combination of at least one of a label, a holder, and the fungible item.

In yet another embodiment, the method further comprises: segmenting the digital form of the non-fungible physical (NFP) item into a plurality of segments; and registering the plurality of segments as a plurality of non-fungible tokens on the blockchain, wherein a segment of the plurality of segments comprise the unplanned pattern to provide high security against counterfeiting.

In yet another embodiment, the method further comprises: segmenting the non-fungible physical (NFP) item into a plurality of zones during the manufacturing, wherein a zone of the plurality of zones comprises the unplanned pattern to provide high security against counterfeiting.

In yet another embodiment, embedding and layering the identifier within the non-fungible physical item in the unplanned pattern comprises: arranging the identifier with respect to a unique characteristic comprising at least one of a size, a color, a glow, a position, a fluorescence, a shape, or a multi-dimensional aspect to identify the non-fungible physical (NFP) item as unique and authentic against counterfeiting. The identifier comprises at least one of a random, a visible, an invisible, and a machine-readable marker identified based on the arrangement.

In yet another embodiment, embedding and layering the identifier within the non-fungible physical item in the unplanned pattern comprises: dispersal of the identifier with respect to a unique characteristic comprising at least one of a size, a color, a glow, a position, a fluorescence, a shape, and a multi-dimensional aspect to identify the non-fungible physical (NFP) item as unique and to provide high security against counterfeiting. The identifier comprises at least one of a random, a visible, an invisible, and a machine-readable marker identified based on the dispersal.

In yet another embodiment, embedding and layering the identifier within the non-fungible physical item in the unplanned pattern comprises: capturing the identifier in one of a base and a composite material of the non-fungible physical item during conversion of a raw material to an end product while manufacturing the non-fungible physical item.

In yet another embodiment, embedding and layering the identifier within the non-fungible physical item in the unplanned pattern comprises: performing tampography using at least one of an ink and a coating to stamp a three-dimensional (3D) object with the identifier in the non-fungible physical item.

In yet another embodiment, the method further comprises: establishing a rating scale for risk assessment of counterfeiting, providing certification, providing a numerical rating; and verifying authenticity using the rating scale for risk assessment of counterfeiting and providing the numerical rating.

In yet another embodiment, the method further comprises: creating at least one of a holder, and a label for an item post-manufacture; replacing an existing label and an existing holder with the holder and the label respectively to provide high security against counterfeiting, wherein at least one of the holder and the label comprises the identifier in the unplanned pattern. The holder comprises an NFP enabled and NFP certified holder. The label comprises an NFP enabled and NFP certified label.

In yet another embodiment, embedding and layering the identifier within the non-fungible physical item in the unplanned pattern comprises: embedding matter with a naturally occurring random and/or unique marker to provide high security against counterfeiting.

In yet another embodiment, embedding matter with a naturally occurring random and/or unique marker comprises: embedding diamond in a coin.

In yet another embodiment, embedding and layering the identifier within the non-fungible physical item in the unplanned pattern comprises: embedding a naturally occurring random and/or unique marker and creating an imperfection in a material in the non-fungible physical item.

In yet another embodiment, the method further comprises: registering the non-fungible physical item as a non-fungible digital token, wherein the NFT comprising a combination of the naturally occurring random and/or unique marker, and the imperfection in the material provides high security against counterfeiting.

In yet another embodiment, embedding and layering the identifier within the non-fungible physical item in the unplanned pattern comprises: arranging the identifier with respect to a unique characteristic comprising at least one of a size, a color, a glow, a position, a fluorescence, a shape, or a multi-dimensional aspect to identify the non-fungible physical (NFP) item as unique and authentic against counterfeiting. The identifier comprises at least one of a random, a visible, an invisible, and a machine-readable marker identified based on the arrangement.

In yet another embodiment, embedding and layering the identifier within the non-fungible physical item in the unplanned pattern comprises: dispersal of the identifier with respect to a unique characteristic comprising at least one of a size, a color, a glow, a position, a fluorescence, a shape, and a multi-dimensional aspect to identify the non-fungible physical (NFP) item as unique and to provide high security against counterfeiting. The identifier comprises at least one of a random, a visible, an invisible, and a machine-readable marker identified based on the dispersal.

In yet another embodiment, embedding and layering the identifier within the non-fungible physical item in the unplanned pattern comprises: capturing the identifier in one of a base and a composite material of the non-fungible physical item during conversion of a raw material to an end product while manufacturing the non-fungible physical item.

In yet another embodiment, embedding and layering the identifier within the non-fungible physical item in the unplanned pattern comprises: performing tampography using at least one of an ink and a coating to stamp a three-dimensional (3D) object with the identifier in the non-fungible physical item.

In yet another embodiment, the method further comprises: establishing a rating scale for risk assessment of counterfeiting, providing certification, providing a numerical rating;

and verifying authenticity using the rating scale for risk assessment of counterfeiting and providing the numerical rating.

In yet another embodiment, the method further comprises: creating at least one of a holder, and a label for an item post-manufacture; replacing an existing label and an existing holder with the holder and the label respectively to provide high security against counterfeiting, wherein at least one of the holder and the label comprises the identifier in the unplanned pattern. The holder comprises an NFP enabled and NFP certified holder. The label comprise an NFP enabled and NFP certified label.

In yet another embodiment, embedding and layering the identifier within the non-fungible physical item in the unplanned pattern further comprises: embedding matter with a naturally occurring random and/or unique marker to provide high security against counterfeiting.

In yet another embodiment, embedding matter with a naturally occurring random and/or unique marker comprises: embedding diamond in a coin.

In yet another embodiment, embedding and layering the identifier within the non-fungible physical item in the unplanned pattern further comprises: embedding a naturally occurring random and/or unique marker and creating an imperfection in a material in the non-fungible physical item.

In yet another embodiment, the method further comprises: registering the non-fungible physical item as a non-fungible digital token, wherein the NFT comprising a combination of the naturally occurring random and/or unique marker, and the imperfection in the material provides high security against counterfeiting.

In yet another aspect, a non-transitory storage medium is described. The non-transitory storage medium storing a sequence of instructions, which when executed by a processor causes: capturing a random uniqueness of a non-fungible physical item in a digital file, wherein the digital file comprises a digital form of the non-fungible physical item; and registering the digital form of the non-fungible physical item as a non-fungible token (NFT) onto a blockchain.

In an embodiment, the non-transitory storage medium further causes: pairing the non-fungible physical (NFP) item with the non-fungible token (NFT) using an identifier through a secured link. The non-transitory storage medium further causes: enabling two-way mutual authentication between the non-fungible physical (NFP) item and the non-fungible token (NFT). In yet another embodiment, the non-transitory storage medium further causes: verifying authenticity of the non-fungible physical (NFP) item using an authentication device.

In yet another embodiment, verifying the authenticity of the non-fungible physical (NFP) item using the authentication device causes: scanning an image of the non-fungible physical (NFP) item; extracting, via an artificial intelligence unit, a second unplanned pattern information of the identifier; comparing the second unplanned pattern information with a first unplanned pattern information of the digital form; and verifying, via the artificial intelligence unit, the authenticity of the non-fungible physical (NFP) item based on the comparison.

In yet another embodiment, verifying the authenticity of the non-fungible physical (NFP) item using the authentication device further causes: determining individual varied degree of security level of the non-fungible physical (NFP) item over a course of time based on the comparison; and providing a grading to the non-fungible physical (NFP) item using a rating scale based on the individual varied degree of security level and the authenticity verified via the artificial intelligence unit.

In yet another embodiment, the non-transitory storage medium further causes: segmenting the digital form of the non-fungible physical (NFP) item into a plurality of segments; and registering the plurality of segments as a plurality of non-fungible tokens on the blockchain. The segment of the plurality of segments comprises an unplanned pattern to provide high security against counterfeiting.

In yet another aspect, a non-fungible physical (NFP) item is described. The non-fungible physical (NFP) item comprises an identifier embedded and layered within the non-fungible physical item in an unplanned pattern. The identifier in the unplanned pattern is configured to provide high security against counterfeiting of the non-fungible physical (NFP) item. The identifier comprises at least one of a random marker and a unique marker. The unplanned pattern comprises the identifier in the NFP item in at least of a random pattern and a unique pattern.

In an embodiment, the non-fungible physical (NFP) item comprises a reference point, the reference point is adapted to one of authenticate the non-fungible physical (NFP) item and estimate a condition of the non-fungible physical (NFP) item over a course of time.

In another embodiment, the non-fungible physical (NFP) item comprises a multi-layered item.

In yet another embodiment, the non-fungible physical (NFP) item comprises one of a trading card, a comic book, a collectible coin, a work of art, a legal document, a label, and a holder.

In yet another embodiment, the NFP item is contained in a holder, the holder comprises one of a transparent holder and a non-transparent holder.

In yet another embodiment, the non-fungible physical (NFP) item comprises a predefined thickness adapted for performing digital printing with variable data.

In yet another embodiment, the digital printing on the non-fungible physical (NFP) item creates an art of work with a different medium, wherein the different medium comprises at least one of an acrylic, pastels, a watercolor, an oil, a gouache, a pencil, a charcoal, a crayon, an enamel, a Prisma color, an art marker, a highlighter, a marker, a paint, and an ink.

In yet another embodiment, the non-fungible physical (NFP) item is retrofitted to a fungible item to convert the fungible item to a non-fungible item.

In yet another embodiment, the non-fungible item comprises a combination of at least one of a label, a holder, and the fungible item, wherein at least one of the label and the holder comprises the identifier embedded and layered in the unplanned pattern.

In yet another embodiment, the fungible item comprises one of a collectible item, a legal document, a work of art, a sticker, a painting, and a sculpture.

In yet another embodiment, the non-fungible physical item comprises a plurality of zones, wherein each zone of the plurality of zones comprise the unplanned pattern to provide high security against counterfeiting.

In yet another embodiment, the non-fungible physical item comprising a combination of at least one of a label and a holder is retrofitted to a relic to form a secure pod.

In an aspect, a system is described. The system comprises an authentication device that comprises a sensor and a backlight unit. The authentication device is configured to verify authenticity of a non-fungible physical (NFP) item comprising an identifier embedded and layered within the non-fungible physical (NFP) item. The identifier comprises at least one of a random marker and a unique marker. The unplanned pattern comprises the identifier in the NFP item in at least one of a random pattern and a unique pattern.

In yet another embodiment, the authentication device is configured to create a digital file of the non-fungible physical (NFP) item. The digital file comprises a digital form of the non-fungible physical (NFP) item and a first unplanned pattern information of the non-fungible physical (NFP) item.

In yet another embodiment, the first unplanned pattern information comprises a location, a position, a shape, a size, a color, a pattern, a reference point, and a dimension of the identifier with respect to the non-fungible physical (NFP) item.

In yet another embodiment, the authentication device is configured to register the digital file of the non-fungible physical (NFP) item as a non-fungible token (NFT) with at least one of a blockchain and a third-party grading and authentication service and use the digital file as a reference to authenticate, determine condition, and provenance of the non-fungible physical (NFP) item in future.

In yet another embodiment, the authentication device is configured to pair the non-fungible physical (NFP) item with the non-fungible token (NFT) using the identifier through a secured link and enable mutual authentication between the non-fungible physical (NFP) item and the non-fungible token (NFT) through the secured link.

In yet another embodiment, the authentication device is configured to verify the authenticity of the non-fungible physical (NFP) item by: scanning an image of the non-fungible physical (NFP) item; extracting, via an artificial intelligence unit, a second unplanned pattern information of the identifier; comparing the second unplanned pattern information with a first unplanned pattern information of a digital form; and verifying, via the artificial intelligence unit, the authenticity of the non-fungible physical (NFP) item based on the comparison.

In yet another embodiment, the digital form of the non-fungible physical (NFP) item comprises a plurality of segments, wherein the plurality of segments are registered as a plurality of non-fungible tokens on the blockchain.

In yet another aspect, a method is described. The method comprises: embedding and layering an identifier within a non-fungible physical item in an unplanned pattern. The identifier in the unplanned pattern is configured to provide high security against counterfeiting of the non-fungible physical (NFP) item.

In yet another aspect, a process of authenticating a collectible item is described. The process comprises: marking at least a portion of the collectible item with a variety of randomly generated fingerprints configured to make duplication of the fingerprints impossible; and pairing the collectible item with the variety of randomly generated fingerprints with a non-fungible token (NFT). The collectible item comprises a multi-layered material.

In an embodiment, a first fingerprint of the variety of randomly generated fingerprints is created by infusing precious metals into an intaglio border of the at least a portion of the collectible item.

In another embodiment, a second fingerprint of the variety of randomly generated fingerprints is created by including randomly generated negative and positive microtext into the intaglio border.

In yet another embodiment, a third fingerprint of the variety of randomly generated fingerprints is created by imbedding precious-metal-infused holographic foil into at least a second portion of the collectible item. The precious-metal-infused holographic foil comprises multiple security features viewable by a magnifying loop and laser.

In yet another embodiment, the multiple security features comprise at least one of guilloche fine lines, morphing effects, a flip image, a laser-viewable image, a micro image, lens effects, intentional errors, micro text, and nano text.

In yet another embodiment, at least a second portion of the collectible item comprises banknote paper. A fourth fingerprint of the variety of randomly generated fingerprints comprises a repeating rope watermark pattern in the banknote paper that is viewable from a front side and a back side of the collectible item when it is held against a light source.

In yet another embodiment, a fifth fingerprint of the variety of randomly generated fingerprints is created by imbedding fibers into the multi-layered material which are randomly dispersed therein, and which are only viewable under UV light.

In yet another embodiment, the fifth fingerprint is configured to enhance authentication because a counterfeit collectible item would have to have randomly dispersed fibers identical in size, shape, color, and pattern as those of an original collectible item.

In yet another embodiment, a sixth fingerprint of the variety of randomly generated fingerprints is created by imbedding authenticating features into the multi-layered material which are invisible unless they are viewed under a UV light.

In yet another embodiment, the UV light is a 365 nm wavelength UV light.

In yet another embodiment, a seventh fingerprint of the variety of randomly generated fingerprints includes incorporating a five-color offset into the multi-layered material.

In yet another embodiment, the collectible item is one of a trading card, a comic book, a collectible coin, a work of art, and a designer accessory or apparel.

In yet another embodiment, an eighth fingerprint of the variety of randomly generated fingerprints includes individual serial numbering within a floating frame.

In yet another embodiment, the precious-metal-infused holographic foil comprises a variable edge.

In yet another embodiment, the intaglio border comprises a stereoscopic element within the NFP item which provides illusion of 3D space as another identifier.

In yet another embodiment, the identifier in the unplanned pattern provides a random uniqueness to the NFP item and enhances security against counterfeiting.

In yet another embodiment, the identifier comprises a security feature.

In yet another embodiment, the security feature comprises at least one of an overt feature, a covert feature, and a machine-readable feature.

In yet another embodiment, the authentication device is configured to verify authenticity of the non-fungible physical (NFP) item by decoding a security feature.

In yet another embodiment, the authentication device comprises an authentication system.

In yet another embodiment, the server comprises an authentication system

In yet another embodiment, the method further comprises: verifying authenticity of the non-fungible physical (NFP) item through a naked eye.

In yet another embodiment, the method further comprises: verifying authenticity of the non-fungible physical (NFP) item using one of a magnifier, a lens, a light source, and a camera.

In yet another embodiment, the identifier in the unplanned pattern is permanent.

The methods and systems disclosed herein may be implemented in any means for achieving various aspects and may be executed in a form of a non-transitory machine-readable medium embodying a set of instructions that, when executed by a machine, causes the machine to perform any of the operations disclosed herein. Other features will be apparent from the accompanying drawings and from the descriptions that follow.

BRIEF DESCRIPTION OF THE FIGURES

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the Figures, can be arranged, substituted, combined, separated, and designed in a wide variety of different configurations, all of which are contemplated herein. The embodiments are illustrated by way of example and not limitations in the accompanying drawings, in which like references indicate similar elements and in which.

Figure 1A:
FIGS. 1A & 1B illustrates a non-fungible physical item, according to one or more embodiments.

Other features of the present embodiments will be apparent from the accompanying drawings and from the detailed description that follows.

DETAILED DESCRIPTION

Definitions and General Techniques

For simplicity and clarity of illustration, the drawing figures illustrate the general manner of construction. Descriptions and details of well-known features and techniques may be omitted to avoid unnecessarily obscuring the present disclosure. The dimensions of some of the elements in the figures may be exaggerated relative to other elements to help improve understanding of the embodiments of the present disclosure. The same reference numeral in different figures denotes the same elements.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only and is not intended to be limiting. Unless defined otherwise, all technical and scientific terms used herein have the same meaning as commonly understood by one with ordinary skill in the art to which this disclosure belongs.

The articles "a" and "an" are used herein to refer to one or to more than one (i.e., to at least one) of the grammatical object of the article. By way of example, "an element" means one element or more than one element.

The terms "first", "second", "third", and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include", "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

The terms "left", "right", "front", "back", "top", "bottom", "over", "under" and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein should be construed as critical or essential unless explicitly described as such. Furthermore, as used herein, the term "set" is intended to include items (e.g., related items, unrelated items, a combination of related items and unrelated items, etc.), and may be used interchangeably with "one or more". Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

It should be understood that the terms "system," "device," "unit," and/or "module" are used in this disclosure to refer to a different component, portion, or component of the various levels of the order. However, if other expressions may achieve the same purpose, these terms may be replaced by other expressions.

The terms "couple", "coupled", "couples", "coupling", and the like should be broadly understood and referred to as connecting two or more elements mechanically, electrically, and/or otherwise. Two or more electrical elements may be electrically coupled together, but not be mechanically or otherwise coupled together. Coupling may be for any length of time, e.g., permanent, or semi-permanent or only for an instant. "Electrical coupling" includes electrical coupling of all types. The absence of the word "removably", "removable", and the like near the word "coupled", and the like, does not mean that the coupling, etc. in question is or is not removable.

As defined herein, two or more elements or modules are "integral" or "integrated" if they operate functionally together. As defined herein, two or more elements are "non-integral" if each element can operate functionally independently.

As defined herein, "real-time" can, in some embodiments, be defined with respect to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All variations which come within the meaning and range of equivalency of the claims are to be embraced within their scope.

As defined herein, "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to a suitable receiver apparatus.

The actual specialized control hardware or software code used to implement these systems and/or methods is not limiting of the implementations. Thus, the operation and behavior of the systems and/or methods described herein without reference to specific software code, it being understood that any software and any hardware can be designed to implement the systems and/or methods based on the description herein.

may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer will also include, or be operatively coupled to receive data, transfer data or both, to/from one or more mass storage devices for storing data e.g., magnetic disks, magneto optical disks, optical disks, or solid-state disks. However, a computer need not have such devices. Moreover, a computer may be embedded in another device, e.g., a mobile telephone, a personal digital assistant (PDA), a mobile audio player, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a Local Area Network (LAN) and a Wide Area Network (WAN), e.g., Intranet and Internet.

The computing system may include clients and servers. A client and server are generally remote from each other and typically interact through a communication network. The relationship of the client and server arises by virtue of computer programs running on the respective computers and having a client-server relationship to each other.

Embodiments of the present invention may comprise or utilize a special purpose or general purpose computer including computer hardware. Embodiments within the scope of the present invention may also include physical and other computer-readable media for carrying or storing computer-executable instructions and/or data structures. Such computer-readable media can be any media that can be accessed by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

Physical computer-readable storage media includes RAM, ROM, EEPROM, CD-ROM or other optical disk storage (such as CDs, DVDs, etc.), magnetic disk storage or other magnetic storage devices, solid-state disks or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures, and which can be accessed by a general purpose or special purpose computer. Combinations of the above, that enable the transport of electronic data between computer systems and/or modules and/or other electronic devices, are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (NIC), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter has been described in language specific to structural features and/or methodological acts, it is to be understood that the subject matter defined in the claims is not necessarily limited to the described features or acts described. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments.

The disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Unless otherwise defined herein, scientific, and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of, embodiments herein, and other related fields described herein, are those well-known and commonly used in the art.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Even though particular combinations of features are disclosed in the specification, these combinations are not intended to limit the disclosure of possible implementations.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

An initial overview of technology embodiments is provided herein, and specific technology embodiments are then described in further detail. This initial summary is intended to aid readers in understanding the technology more quickly but is not intended to identify key or essential technological features, nor is it intended to limit the scope of the claimed subject matter.

The embodiments herein and the various features and advantageous details thereof are explained more fully with reference to the non-limiting embodiments that are illustrated in the accompanying drawings and detailed herein.

In order to fully understand the scope of the invention, the following terms used herein are hereby defined.

The following terms and phrases, unless otherwise indicated, shall be understood to have the following meanings.

The term "non-fungible physical (NFP) item", as used, refers to a physical item that holds non-fungible features. The NFP item may comprise an identifier. The identifier may be embedded in the NFP item. The identifier is an identifier used to verify authenticity of the NFP item. The NFP item may comprise the identifier in an unplanned pattern. The unplanned pattern provides a uniqueness to the NFP item which cannot be reproduced or replicated which in turn provides high security against counterfeiting.

The term "non-fungible physical (NFP) enabled", as used, refers to the non-fungible physical item having various random and/or unique markers embedded and layered in a way creating a random uniqueness, making counterfeiting of the physical item virtually impossible. The "NFP enabled" random and/or unique markers may be identifiable by arrangement, dispersal, and one or more unique characteristics, including, but not limited to, size, color, glow, position, orientation, fluorescence, shape, weight, material composition, or a multi-dimensional aspect which identifies that something physical as unique and can be captured in digital form and used for authentication. The "NFP enabled" items may comprise at least one of overt features, covert features, and machine readable features. These features have to be decoded to verify authenticity. The "NFP enabled" items are capable of verifying authenticity through a manually means (verified through a naked eye), or using one of a magnifier, a lens, a light source, a camera etc, or through an external electronic device (e.g., authentication device) which involves, scanning, decoding, decrypting, and verifying authenticity automatically. In an embodiment, the term "NFP enabled" refers to a physical item (e.g., non-fungible physical item) with uniqueness created by way of random and/or unique marker(s), that can be captured in digital form and used for future authentication. The NFP enabled is designed to prevent duplication and/or extras (e.g., a similar item). Further "NFP enabled" is defined as something physical with existing and/or incorporated and captured markers which create a random uniqueness of the NFP item and can be paired to the digital form for mutual authentication.

In an embodiment, the term "non-fungible physical (NFP) enabled" as used refers to the non-fungible physical item having various random and/or unique markers embedded and layered in a way creating a random uniqueness, making counterfeiting of the physical item virtually impossible. The "NFP enabled" items may comprise at least one of overt features, covert features, and machine readable features. These features have to be decoded to verify authenticity. The "NFP enabled" items are capable of verifying authenticity through manually (verified through a naked eye), or using one of a magnifier, a lens, a light source, a camera etc, or through an external electronic device (e.g., authentication device) which involves, scanning, decoding, decrypting, and verifying authenticity automatically etc. In an embodiment, the term "NFP enabled" refers to a physical item (e.g., non-fungible physical item) with uniqueness created by way of random and/or unique marker(s), that can be captured in digital form and used for future authentication. The NFP enabled is designed to prevent duplication and/or extras (e.g., a similar item). Further "NFP enabled" is defined as something physical with existing and/or incorporated and captured markers which create a random uniqueness of the NFP item and can be paired one to one to the digital version for mutual authentication.

The term "non-fungible physical (NFP) certified," as used herein, refers to the unique, secure, digital pairing with an NFP Enabled item, in a way that makes them mutually authenticating and registered on a blockchain and/or with a provider of registration services. In an embodiment, the verification and certification may be done by an authentication system. The authentication system may reside within the authentication device or a server. The verification and certification may be done either online or offline. The NFP enabled uniqueness is captured in digital form and registered as a Non-Fungible Token (NFT) or otherwise is captured in such a way that creates a secure two-way mutual authentication, thus creating an impenetrable barrier to anyone trying to counterfeit.

In an embodiment, the term "non-fungible physical (NFP) certified" as used refers to a digital version of the non-fungible physical item for which authenticity has been verified and certified. The verification and certification may be done by a third party grading service. In an embodiment, the verification and certification may be done by an authentication system. The authentication system may reside within the authentication device or a server. The verification and certification may be done either through online or offline. The NFP enabled uniqueness is captured in digital form and registered as a Non-Fungible Token (NFT) or otherwise in such a way that creates secure two-way mutual authentication of NFP enabled and digital, thus creating an impenetrable barrier to anyone trying to counterfeit. Further "NFP certified" is the unique one to one pairing of an NFP Enabled item and digital version (NFT) making them mutually authenticated, and registered on a blockchain or with a provider of registration services.

The term "non-fungible token (NFT)", as used, refers to a cryptographic asset on a blockchain that represents an intangible and unique digital item. The NFT cannot be modified or changed once it is recorded in the blockchain. NFT represents a unique asset such as a piece of art, digital content, or media. NFT may also refer to a digital form of the NFP item.

The terms "random marker" and/or "unique marker" refers to an identifier that possesses one or more random and unique characteristics and/or is randomly and uniquely dispersed within the NFP item. The random marker and/or unique marker dispersed within the NFP item may comprise an unplanned pattern which provides uniqueness and randomness to the NFP item and provides enhanced security against counterfeiting.

The terms "fingerprint" may also refer to an identifier. The fingerprint may comprise at least one of the random marker and the unique marker. The fingerprint may be at least one of randomly and uniquely generated security feature in the NFP item. The fingerprint may be embedded and layered within the NFP item.

The term "substrate" refers to a base layer on which something is built. The substrate may also refer to an underlying layer or substance. The substrate may be a paper, a cardboard, a label, a holder, etc. The substrate may have different thicknesses depending on the usage.

The term "adhesive layer" refers to a layer that can stick or adhere to the substance or the item.

The term "unplanned pattern" refers to a placement or dispersion of the identifier uniquely and randomly within the NFP item. The unplanned pattern may be formed by embedding and layering the identifier in the NFP item. The unplanned pattern provides uniqueness to the NFP item and enhances security against counterfeiting. The unplanned pattern may refer to formation or dispersal or arrangement of at least one of the random marker and the unique marker within the NFP item in at least one of a random pattern and a unique pattern.

The term "counterfeiting" refers to a crime, involving the manufacturing or distribution of goods under someone else's name without permission.

The term "holographic foil" refers to a foil that features an embossed pattern within the layers of the foil which refracts light at differing angles, presenting an impressive spectrum of color. Holographic foil may be applied using machinery which uses heat and pressure to 'stamp' the foil onto an NFP item. Holography is defined as a method of producing a three-dimensional (3D) impression, or photographic image, of an object.

The term "watermark" as used refers to an identifying image or pattern in the NFP item that appears as various shades of lightness/darkness when viewed by transmitted light (or as an image or pattern atop a dark background when viewed by reflected light), caused by thickness or density variations in the NFP item.

The term "fibers" as used refers to thread or filament like structures. The fibers may be randomly dispersed/free floated during the production of the NFP item creating an unplanned pattern within the NFP item. The fibers may be invisible fibers or visible fibers.

The term "invisible fibers", as used, refer to fibers that are not visible to the naked eye. The invisible fibers may be visible when viewed under a backlight. The backlight may be an ultraviolet (UV) light.

The term "visible fibers", as used, refer to fibers that are visible to the naked eye without holding a backlight.

The term "intaglio", as used, refer to a design or a piece of art which is engraved or etched into something. The term "intaglio" also refers to any printing method in which the ink is laid upon the sunken parts of the printing form.

The term "floating frame", as used, refers to a frame that is not fixed in one position, place, or level.

The term "reference point", as used, refers to a point used for comparison to judge or understand something else (such as condition, provenance, etc. of the NFP item).

The term "variable edge", as used, refers to edges that do have standard or finished edges. The variable edges may comprise edges that are irregular, unique, and random.

The term "multi-layered item" refers to an item having or involving several distinct layers, strata, or levels.

The term "holder" refers to a device or implement for holding an NFP item.

The term "digital form", as used, refers to an electronic form of an NFP item.

The term "digital file", as used, refers to a file that holds the information of the NFP item in a digital format.

The term "provenance", as used, refers to a place of origin or earliest known history of the NFP item.

The term "Variable data printing (VDP)" is a form of digital printing, including on-demand printing, in which elements such as text, graphics and images may be changed from one printed piece to the next, without stopping or slowing down the printing process and without using information from a database or external file.

The term "embedding" refers to a process of fixing (an object) firmly and deeply in a surrounding mass.

The term "layering" refers to a process of arranging something in layers.

The term "grading", as used, refers to an act of classifying something on a scale by quality, rank, size, or progression, etc.

The term "scale" refers to an ordered system of numbering or indexing that is used as a reference standard in measurement, in which each number corresponds to some physical quantity.

Security features, like holographic stickers, are things that brands use for Intellectual Property (IP) brand protection, which is commercially available, and that's kind of where everybody operates. All of these security features are easily exploited by counterfeiters, so the end result is that these protections are ineffective. Anything that is commercially available can be counterfeited and so it has been a huge problem.

Counterfeiting has surpassed drug and human trafficking combined. It is the fastest growing criminal enterprise in the world. It is costing trillions of dollars in economic damages and millions of lost jobs, and reputational risk for brands.

In an aspect, a non-fungible physical (NFP) item is described. As an example, FIG. 1A illustrates the non-fungible physical item 102, according to one or more embodiments. The non-fungible physical item 102 comprises an identifier embedded and layered within the non-fungible physical item 102 in an unplanned pattern. The identifier, in the unplanned pattern, is configured to provide high security against counterfeiting of the non-fungible physical (NFP) item. The identifier comprises at least one of a random marker and a unique marker. The unplanned pattern comprises the identifier in the NFP item in at least of a random pattern and a unique pattern.

In an embodiment, the identifier comprises at least one of or combination of a holographic foil 104A-B, a unique serial identification (ID) number 106, and a plurality of fibers 108A-N. The non-fungible physical item 102 further comprises an intaglio border 110; a watermark, and an authenticating feature. The non-fungible physical item 102 may comprise a lamination. In an embodiment, the non-fungible physical item 102 comprises a reference point. The reference point is adapted to authenticate the non-fungible physical (NFP) item 102. The reference point is adapted to estimate a condition of the non-fungible physical (NFP) item over a course of time. The NFP item 102 may comprise a substrate.

The holographic foil 104A-B may be seen at the right of the product in FIG. 1A (i.e., a rectangle and a square) below the unique serial identification (ID) number 106. The holographic foil 104A-B comprises a random uniqueness by having a different wallpaper design. The holographic foil 104A-B may be stamped by stamping only a section of the wallpaper design. Each NFP item may have a slightly different section of the wallpaper design which in turn creates uniqueness. The holographic foil 104A-B comprises a variable edge. In an embodiment, the holographic foil 104A-B comprises a variable edge at a particular location and position of the non-fungible physical item 102. The variable edge is not straight. The variable edge has a very distinctive pattern which can be seen clearly under magnification. The variable edge provides uniqueness to the non-fungible physical item 102. The variable edge may be obtained by performing stamping node-to-node on the NFP item using a stamping die. The stamping produces a completely random and unique edge, i.e., the variable edge.

The NFP item 102 comprises a box around the variable edge. The box is used as a reference point to basically show the tolerances. The background printing does not get printed under the holographic foil 104A-B. the box (i.e., the whitespace shown in FIGS. 1A and 1B around the holographic foil 104A-B) is adapted to stop the background printing before the holographic foil 104A-B. When stamping the holographic foil 104A-B node-to-node, the stamping does not go into in the exact same place, there is a little bit of a bounce. The stamping bounces to the right, left, up, down, and diagonally, and that creates a bounce. The box around the holographic foil 104A-B depicts the bounce. The imperfections create the uniqueness which cannot be counterfeited.

Further the holographic foil 104A-B comprises a plurality of security features embedded within the holographic foil 104A-B. The holographic foil 104A-B comprises at least one of a guilloche fine line, a morphing effect, a flip image, a laser-viewable image, a micro image, a lens effect, an intentional error, a micro text, and a nano text as the plurality of security features. The plurality of security features may be unique and random with respect to each holographic foil. The holographic foil 104A-B comprises multiple degrees of complexity which makes this holographic foil 104A-B element extremely difficult to duplicate. The holographic foil 104A-B may comprise a colorized hologram type foil with its own security features within the holographic foil 104A-B. The holographic foil 104A-B may comprise an adhesive layer upon which a metal (e.g., 24K gold) is infused into the adhesive layer of the holographic foil 104A-B.

The unique serial identification (ID) number 106 may be floating within a floating frame of the NFP item 102. The non-fungible physical (NFP) item 102 comprises uniqueness in at least one of a location, a size, a shape, and a position of the unique serial identification (ID) number 106. The floating frame may also comprise a box which stops the background printing before the floating frame and the unique serial identification (ID) number 106. The unique serial identification (ID) number 106 may be unique to the NFP item 102. The position, and location, of the unique serial identification (ID) number 106 may be unique to the NFP item 102.

The plurality of fibers 108A-N may comprise one of invisible fibers and visible fibers. The plurality of fibers 108A-N may be randomly dispersed during production of the NFP item 102. The plurality of fibers 108A-N may be randomly dispersed within a semi-fluid pulp of the NFP item 102. The plurality of fibers 108A-N may free float and settle in an unplanned pattern as dehydration occurs to the semi-fluid pulp. The plurality of fibers 108A-N may comprise an unplanned pattern in both sides (front die and back side) of the NFP item 102. The unplanned pattern of the plurality of fibers 108A-N provides uniqueness to the NFP item 102. The plurality of fibers 108A-N may be captured and authenticated via a camera of a mobile phone. The authentication of plurality of fibers 108A-N does not need a special tool. In an embodiment, the plurality of fibers 108A-N are created so that we can work with third party grading authentication services such as certified collectibles group (which do not use a blacklight as part of their grading and authentication process). The third party grading authentication services are still able to capture uniqueness on a product and verify authenticity without using any additional tool. The third party grading authentication services may certify the NFP item as a "NFP certified" product.

The watermark comprises a Fourdrinier watermark. The watermark also provides uniqueness to the NFP item 102. The watermark may be embedded and layered onto a front side and a back side of the NFP item 102. The watermark may be visible over a surface of the non-fungible physical item against a reflection of a light source when the NFP item 102 comprises the lamination. In an embodiment, the non-fungible physical item 102 renders the Fourdrinier watermark to be visible over a surface of the non-fungible physical item against a reflection of a light source when a digital ink is placed over the non-fungible physical item.

Figure 1B:

The intaglio border 110 is like a border that goes around the NFP item 102. The intaglio border 110 is just like a raised textured print. The intaglio border 110 may be infused with a metal (e.g., 24K Gold). The NFP item 102 further comprises a tag that makes inks in the NFP item 102 detectable. The tag enables detecting ink that was infused with the metal (e.g., precious metals, copper, etc.). Similarly, FIG. 1B illustrates the non-fungible physical item 102 which is similar to FIG. 1A having a different unique serial identification (ID) number.

In an embodiment, the NFP item 102 comprises three levels of security. The first level of security comprises at least one overt feature. The overt feature (e.g., visible fibers, serial numbers, intaglio border 110, etc.) may be the features that are visible to the naked eye of the general public. The second level of security comprises at least one covert feature. The covert feature may comprise holographic foil, invisible fibers, watermarks, UV authenticating features, etc. The second level of security may need devices such as a magnifier, a lens, a camera, a UV light, etc., to verify the authenticity. The third level of security may comprise machine-readable features. The machine-readable features may need an authentication device to extract the unplanned pattern of the identifier and compare it with the prestored unplanned pattern information of the digital file of the same NFP item. The authentication device, based on the comparison then communicates a grade of authenticity to the user.

In an embodiment, the non-fungible physical (NFP) item comprises a multi-layered item. In an embodiment, the authenticating feature is embedded into the multi-layered item of the non-fungible physical item 102. The non-fungible physical (NFP) item 102 may also comprise a predefined thickness adapted for performing a digital printing using the non-fungible physical (NFP) item as a medium. In an embodiment, the non-fungible physical (NFP) item 102 comprises the predefined thickness adapted for performing digital printing with variable data. Digital printing on the non-fungible physical (NFP) item 102 enhances security against the counterfeiting by combining the variable data with the identifier. In an embodiment, the digital printing on the non-fungible physical (NFP) item 102 creates an art of work on a different medium. The art of work on the different medium comprise a high value based on rarity on a medium. The non-fungible physical (NFP) item 102 may be one of a trading card, a comic book, a collectible coin, a work of art, a legal document, a label, and a holder. In an embodiment, the holder is adapted to hold the non-fungible physical (NFP) item. The holder may be one of a transparent holder and a non-transparent holder.

In an embodiment, the non-fungible physical (NFP) item 102 is retrofitted to a fungible item to convert the fungible item to a non-fungible item. The fungible item comprises one of a collectible item, a legal document, a work of art, a sticker, a painting, and a sculpture, The non-fungible item comprises a combination of at least one of a label, a holder, and the fungible item, wherein at least one of the label and the holder comprises the identifier embedded and layered in the unplanned pattern.

In another embodiment, the non-fungible physical item 102 comprises a plurality of zones. Each zone of the plurality of zones comprises an unplanned pattern to provide high security against counterfeiting. The plurality of zones enables the single non-fungible physical item 102 to have fractional ownership i.e., each zone may be owned by an owner. The non-fungible physical (NFP) item 102 can be sold into parts.

In yet another embodiment, the non-fungible physical item 102 comprising a combination of at least one of a label and a holder is retrofitted to a relic to form a secure pod. The secure pod may comprise a place holder to hold a fungible item. In yet another embodiment, the non-fungible physical item 102 comprises a lamination. The lamination enables a Fourdrinier watermark to be visible over a surface of the non-fungible physical item against a reflection of a light source. The non-fungible physical item 102 may also comprise an intaglio border 110 over the lamination. The intaglio border 110 may comprise one of a micro-text and a nano-text within the intaglio border 110.

The non-fungible physical item comprises a high security printing that may be reserved for central banks to print banknotes and currency, and for other government agencies to print high security documents, such as birth certificates. The non-fungible physical item may be a document where one can create an identity and make it highly protected.

The non-fungible physical item is a product which demonstrates government level security with abilities to authenticate that product, using the security features. One of the key ingredients that make the non-fungible physical item is so secure, is when a security feature is random. The non-fungible physical item cannot be reproduced or duplicated. All the things that you see in the commercial space are not that secure and can be easily replicated or counterfeited e.g., Quick Response codes, serial numbers.

The non-fungible physical item comprises, or creates security features that are at least one of random and unique. There is no way to control the security features or variables that produced that feature. As an example, invisible fibers exist in high security items or papers (e.g., non-fungible physical item), such as banknote papers. When the paper is made, they have pulp in liquid form, and the fibers in different sizes, shapes, and colors are dumped into the mix and they free float. When the paper is dehydrated, the fibers are frozen in place in completely random and different positions. These fibers create a pattern which could be used to authenticate the product, but there is no way to place the fibers in the exact position, shape, and color if you were attempting to counterfeit this product. This provides the uniqueness and randomness to the non-fungible physical item.

Each piece of non-fungible physical item has two distinct patterns, one in the front, and one in the back which are different from each other. This is used as a base. Other elements, such as holographic foil, are designed to work in similar ways to create more random uniqueness.

The process goes above and beyond government security. In government security, there is some random uniqueness, but it is not used for authentication, because it is not practical. There are billions of banknotes, and it is not possible to capture billions of banknotes. There is no need for capturing billions of banknotes. The need is to know if the banknote is authentic or fake. There is also no need to know that it is the exact banknote that was produced, but just to know if the banknote is real.

In collectibles, it is a different consideration. In the collectibles, there is a need to know that it is the exact item that was produced because a lower serial number could mean 10s of 1000s of dollars in difference in value. There are other considerations and collectibles. While the process uses the same protections that the government uses, the non-fungible physical item adds the ability to capture that uniqueness in each and every item, and the ability to use a digital file that shows the identifiers, as a reference point to authenticate the physical product. The physical product has the identifiers which comprises the random uniqueness. The digital form captures that uniqueness. And then we use the digital form to authenticate the physical item.

The non-fungible physical item 102 is applicable outside of the collectible space, as well as in the collectible space. In collectibles, the trading card industry uses thick paper. No high level security features exist for thickness of trading cards. Part of the process described herein has been implemented to develop paper (e.g., non-fungible physical item 102) of different thicknesses with the security features mentioned above as applicable for different sectors. Requirements for such paper are developed and worked through with a high security printer. The non-fungible physical item 102 contains the first item layer (e.g., substrate layer) with banknote security features and the NFP item is suitable for other uses, such as trading cards.

With this versatile secure product (e.g., non-fungible physical item 102), many avenues are open to create secure items. In the art world, original works of art are created on the non-fungible physical item 102 using at least eighteen different mediums. The eighteen different mediums were tested on the item paper (including oil, acrylic chalk, pencil, colored pencil, household paint) and all worked well. The non-fungible physical item 102 creates the ability to protect original works of art.

In today's world, when a flaw in an item occurs during manufacture it has no protections and can be easily counterfeit. The current standard in this case is to improve the item by attaching something, such as a holographic foil sticker to it. However, both the item and the sticker can easily be counterfeit. The present disclosure teaches about changing that standard by embedding security features (e.g., identifiers) during the manufacturing process into the item itself which cannot be decoupled from the item. They are with the item for the life of the item. The key aspect herein is that some of these security features are random. Randomness is part of the process of creating the non-fungible physical item 102. The random flaw is captured and becomes another security feature of the specific item.

The non-fungible physical item 102 (e.g., paper) also has anti-alteration properties. The identifier in the unplanned pattern is permanent and cannot be decoupled from the NFP item. If a document using the paper is altered, or there is an attempt to erase anything, the paper will react and become permanently discolored which further enhances security against counterfeiting.

Figure 2A:
FIGS. 2A & 2B illustrates a non-fungible physical item having a watermark, according to one or more embodiments.
Figure 2B:

As an example, FIG. 2A illustrates the non-fungible physical item 202 having a watermark 203, according to one or more embodiments. The watermark 203 comprises a Fourdrinier watermark. The watermark 203 may be repeating at different portions of the non-fungible physical item 202 which provides uniqueness and randomness to the non-fungible physical item. The non-fungible physical item 202 is similar to FIG. 1, but having Fourdrinier watermark as an additional random and/or unique marker. Similarly, FIG. 2B illustrates the non-fungible physical item 202 which is similar to FIG. 2A having a different unique serial identification (ID) number.

Figure 3:
FIG. 3 illustrates a diagram showing differences between holographic foil and serial number, according to one or more embodiments.

As an example, FIG. 3 illustrates a diagram showing differences between holographic foil and serial number, according to one or more embodiments. FIG. 3 depicts the difference in the serial numbers 306A and 306B between two non-fungible physical items. Further the serial numbers 306A and 306B are floating within the frame i.e., the location and position of the serial numbers 306A and 306B are different. Further FIG. 3 shows the difference between security features in the holographic foils 307A and 307B. The differences in the patterns of the holographic foils 307A and 307B are clearly visible. The holographic foils 307A and 307B clearly show the differences in the wallpaper design, the positioning within the box, the infusion of metal, and the creation of the variable edge. All these layers create varying degrees of complexity and make this element very difficult to reproduce.

Figure 4A:
FIGS. 4A and 4B illustrate a front side and a back side of a non-fungible physical (NFP) item, according to one or more embodiments.
Figure 4B:
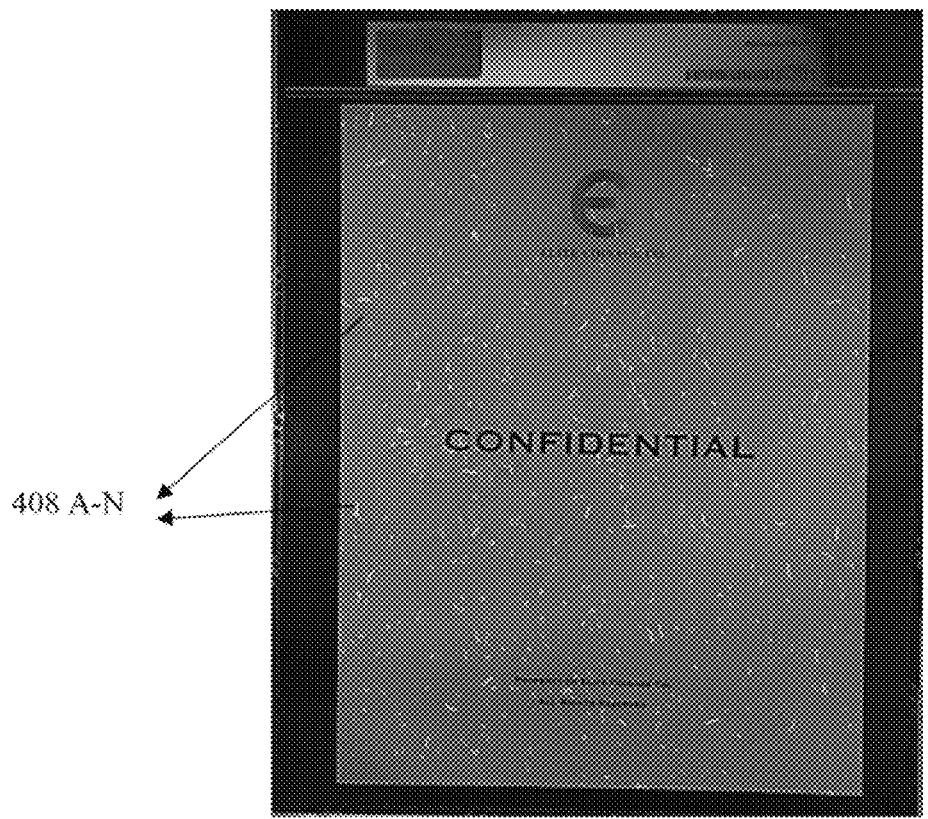

As an example, FIGS. 4A and 4B illustrate a front side and a back side of a non-fungible physical (NFP) item, according to one or more embodiments. The non-fungible physical (NFP) item shown in FIGS. 4A and 4B is a print of a painting. The print of the painting may be created by performing a digital printing on to the non-fungible physical (NFP) item. Digital printing may be done using the variable data. The combination of the variable data and the identifier in the non-fungible physical (NFP) item enhances the security against counterfeiting. The non-fungible physical (NFP) item shown here may comprise a predefined thickness adapted for performing the digital printing. Digital printing enables creation of an art of work on a different medium. Based on the rarity of the medium, the value of the art of work may rise. The non-fungible physical (NFP) item may be placed within a holder which further enhances the security against counterfeiting as the holder may comprise additional identifiers (i.e., random markers and/or unique markers).

FIG. 4A shows the front side of the non-fungible physical (NFP) item. FIG. 4B shows the back side of the non-fungible physical (NFP) item. The front side depicts a painting. The back side depicts the holder. FIG. 4B depicts the identifiers (e.g., a plurality of fibers 408A-N). The plurality of fibers 408A-N may be visible fibers which are visible against the reflection of light. The plurality of fibers may also comprise invisible fibers which are invisible but may be visible when holding a backlight. The backlight may be an ultraviolet (UV) backlight. The U backlight may comprise 365 nm UV backlight.

Figure 5A:
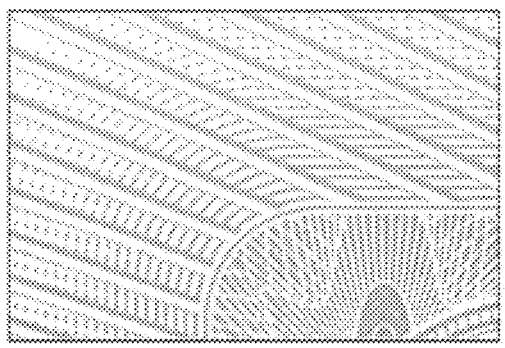
FIG. 5A-5F illustrate security features included in a non-fungible physical (NFP) item, according to one or more embodiments.

As an example, FIG. 5A-5F illustrates security features included in a non-fungible physical (NFP) item, according to one or more embodiments. FIG. 5A illustrates a metal infused intaglio border. The metal infused may be a precious metal (e.g., Gold, Copper, etc.). The intaglio border may be infused on the front end of the non-fungible physical (NFP) item. The intaglio border may be an ultra-detailed, tactile, and raised print. The intaglio border may include randomly generated negative and positive microtext. The intaglio border may be in the particular portion of the non-fungible physical (NFP) item. In an embodiment, the intaglio border is printed over the surface of the non-fungible physical (NFP) item and a lamination is done over the non-fungible physical (NFP) item. In another embodiment, the intaglio border is printed over the lamination of the non-fungible physical (NFP) item. In an embodiment, the intaglio border may comprise a stereoscopic element within the NFP item which provides illusion of 3D space as another identifier. The inclusion of the stereoscopic element within the intaglio border provides uniqueness.

Figure 5B:
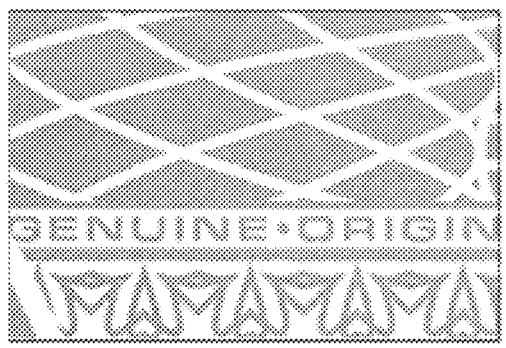

As an example, FIG. 5B illustrates the metal infused intaglio border comprising the negative and positive microtext, according to one or more embodiments. The negative and positive microtext within the intaglio border provides uniqueness. The intaglio border may be printed in different patterns. In an embodiment, the intaglio border comprising the negative and positive microtext is printed over the surface of the non-fungible physical (NFP) item and a lamination is done over the non-fungible physical (NFP) item. In another embodiment, the intaglio border comprising the negative and positive microtext is printed over the lamination of the non-fungible physical (NFP) item.

Figure 5C:
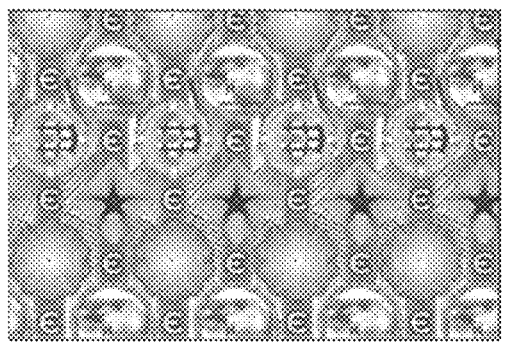

As an example, FIG. 5C illustrates a holographic foil 504 (reference 104 in FIG. 1), according to one or more embodiments. The holographic foil 504 may comprise over 10 security features viewable by magnifying loop and laser (e.g., guilloche fine lines, morphing effects, flip image, laser-viewable image, micro image, lens effect, intentional errors, micro text, and Nano text, etc.). The holographic foil 504 may be stamped by stamping only a section of the wallpaper design. Each holographic foil 504 may have a slightly different section of the wallpaper design which in turn creates uniqueness. The holographic foil 504 comprises a variable edge. In an embodiment, the holographic foil 504 comprises a variable edge at a particular location and position of the non-fungible physical item. The variable edge is not straight. The variable edge foil has a very distinctive random pattern which can be seen clearly under magnification. The variable edge provides uniqueness to the non-fungible physical item. The variable edge may be obtained by performing stamping node-to-node on the NFP item using a stamping die. The stamping produces a completely random and unique edge i.e., the variable edge.

Figure 5D:
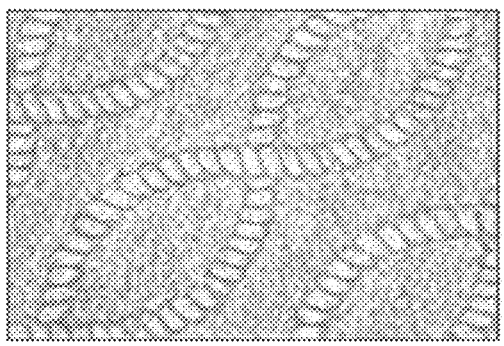

As an example, FIG. 5D illustrates a watermark 503 (reference 203 in FIG. 2), according to one or more embodiments. The watermark 503 comprises a Fourdrinier watermark. The watermark 503 may repeat throughout the non-fungible physical item. The watermark 503 creates an unplanned pattern. The watermark 503 may be embedded and layered within the non-fungible physical item during its production. The watermark 503 may reside within the non-fungible physical item and not at the surface. The Fourdrinier watermark shown in FIG. 5D is a rope like structure.

Figure 5E:

As an example, FIG. 5E illustrates a plurality of fibers 508A-N (reference 108A-N in FIG. 1), according to one or more embodiments. The plurality of fibers 508A-N are mixed with pulp during the production stage. The plurality of fibers 508A-N are randomly dispersed within the pulp. The plurality of fibers 508A-N freely float and settle in an unplanned pattern which cannot be replicated or counterfeited. The pulp may be semi-fluid in the production stage. The pulp then undergoes dehydration during the manufacture of the non-fungible physical item where the plurality of fibers 508A-N get settled. The plurality of fibers 508A-N may be visible fibers or invisible fibers.

Figure 5F:

As an example, FIG. 5F illustrates an authentication feature, according to one or more embodiments. The authentication feature may be embedded and layered within a multi-layered material of the non-fungible physical item. The authentication feature may be artwork (e.g., a work of art, a slipper shown in FIG. 5F), an object, an item, a metal, etc. The authentication feature may be invisible and gets visible only under UV light. The UV light may comprise 365 nm wavelength. The authentication device using a backlight unit may focus the UV light onto the non-fungible physical item and authenticate the non-fungible physical item. The authenticity of the non-fungible physical item is verified when the authentication feature gets visible.

Figure 6:
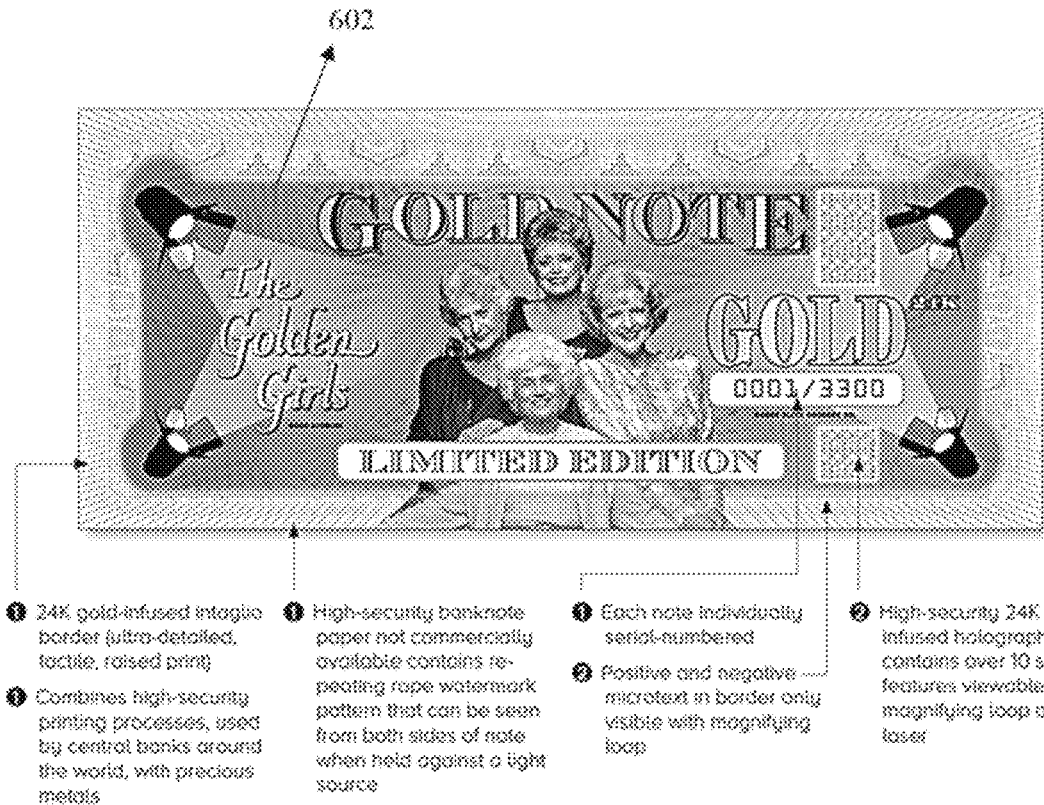
FIG. 6 illustrates security features of a non-fungible physical item, according to one or more embodiments.

As an example, FIG. 6 illustrates a security feature of a non-fungible physical item 602, according to one or more embodiments. The non-fungible physical item 602 may be a currency note. The non-fungible physical item 602 comprises a combination or at least one of security features as shown. The security features comprises a 24K gold infused intaglio border. The intaglio border may be an ultra-detailed, tactile, and raised print. The intaglio border may include randomly generated negative and positive microtext which is visible only with a magnifying loop. The intaglio border may be in the particular portion of the non-fungible physical (NFP) item. In an embodiment, the intaglio border is printed over the surface of the non-fungible physical (NFP) item and a lamination is done over the non-fungible physical (NFP) item. In another embodiment, the intaglio border is printed over the lamination of the non-fungible physical (NFP) item.

The security features further comprises a repeating watermark. The watermark may be a repeating rope watermark pattern that can be seen from both sides when held against a light source. The watermark may be a Fourdrinier rope watermark. The security features further comprises a unique serial identification (ID) number which is floating within the frame. The unique serial identification (ID) number is unique to the non-fungible physical item. The security features comprises a holographic foil. The holographic foil comprises over 10 security features viewable by magnifying loop and laser (e.g., guilloche fine lines, morphing effects, flip image, laser-viewable image, micro image, lens effect, intentional errors, micro text, and Nano text). The security features further comprises a high security printing process, used by central banks around the world with precious metals.

Figure 7:
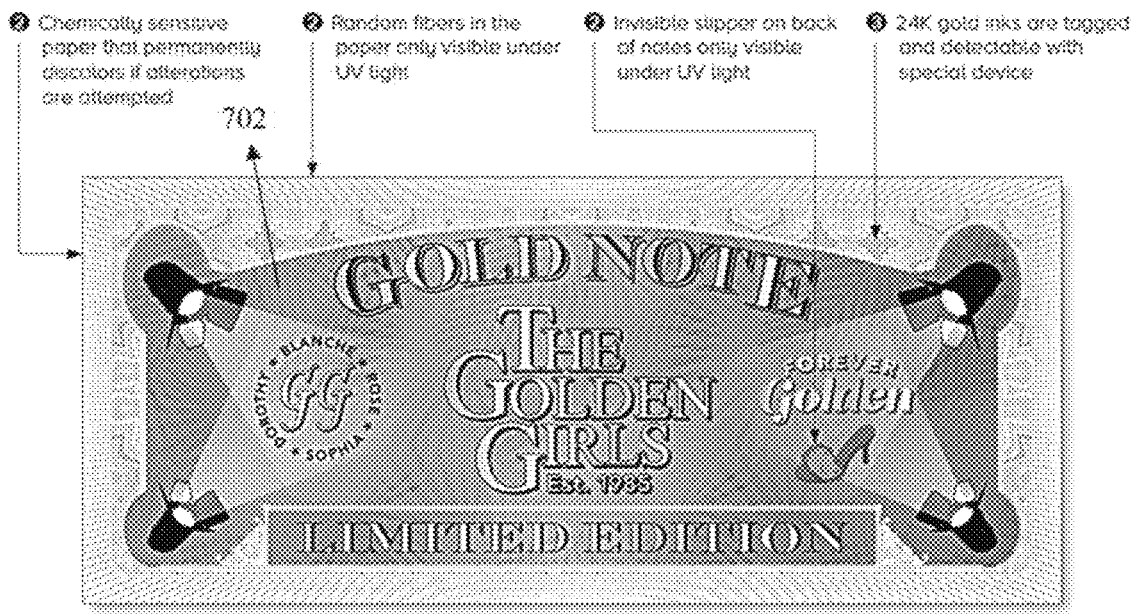
FIG. 7 illustrates security features of a non-fungible physical item, according to one or more embodiments.

As an example, FIG. 7 illustrates a security feature of a non-fungible physical item 702, according to one or more embodiments. The non-fungible physical item 702 may comprise a chemically sensitive paper as one security feature. The chemically sensitive paper permanently discolors when altered. The non-fungible physical item 702 further comprises the plurality of fibers as other security features. The plurality of fibers may be visible under a light source (e.g., UV light source). The non-fungible physical item 702 further comprises the authenticating feature as other security features which are visible under UV light. The non-fungible physical item 702 further comprises the 24K gold ink that are tagged and detectable with a special device.

In an aspect, a system is described herein. The system comprises an authentication device. The authentication device comprises a sensor, and a backlight unit. The authentication device is configured to verify authenticity of a non-fungible physical (NFP) item comprising an identifier embedded and layered within the non-fungible physical (NFP) item in an unplanned pattern. The identifier comprises at least one of a random marker and a unique marker. The unplanned pattern comprises the identifier in the NFP item in at least of a random pattern and a unique pattern.

In an embodiment, the authentication device comprises one of an electronic device, a mobile phone, a tablet, a personal digital assistant, a computer, a laptop, and a desktop.

In another embodiment, the sensor is configured to capture an image of the non-fungible physical (NFP) item. The sensor comprises a camera. The authentication device comprises a scanner. In an embodiment, the authentication device is configured to verify authenticity of the non-fungible physical (NFP) item offline. In another embodiment, the authentication device is configured to communicate with a server and verify authenticity of the non-fungible physical (NFP) item through an internet connection.

In yet another embodiment, the authentication device is configured to create a digital file of the non-fungible physical (NFP) item. The digital file comprises a digital form of the non-fungible physical (NFP) item. The digital file further comprises a first unplanned pattern information of the non-fungible physical (NFP) item. The first unplanned pattern information comprises a location, a position, a shape, a size, a color, a pattern, a reference point, and a dimension of the identifier with respect to the non-fungible physical (NFP) item. The authentication device is further configured to communicate and register the digital form of the non-fungible physical (NFP) item as a non-fungible token (NFT) onto a blockchain. The authentication device may be configured with a mobile application (e.g., authentication system).

In another embodiment, the authentication device is configured to register the digital file with a third-party grading and authentication service on a blockchain. The digital file registered with the third-party grading and authentication service is used as a reference to authenticate, determine condition, and provenance of the non-fungible physical (NFP) item in future. The authentication device is configured to pair the non-fungible physical (NFP) item with the non-fungible token (NFT) using the identifier through a secured link. The secured link is adapted to mutually authenticate between the non-fungible physical (NFP) item and the non-fungible token (NFT).

In an embodiment, the authentication device comprises an artificial intelligence unit. The authentication device is configured to verify the authenticity of the non-fungible physical (NFP) item by: scanning an image of the non-fungible physical (NFP) item; extracting, via an artificial intelligence unit, a second unplanned pattern information of the identifier; comparing the second unplanned pattern information with a first unplanned pattern information; and verifying, via the artificial intelligence unit, the authenticity of the non-fungible physical (NFP) item based on the comparison.

In another embodiment, the authentication device is further configured to compare the second unplanned pattern information with the first unplanned pattern information to determine individual varied degree of security level of the non-fungible physical (NFP) item over a course of time; and provide a grading to the non-fungible physical (NFP) item based on the individual varied degree of security level and the authenticity verified via the artificial intelligence unit.

In yet another embodiment, the authentication device is further configured to define and enforce rules with respect to a smart contract on a blockchain for one of licensing and sale of the NFP item and NFT. The digital form of the non-fungible physical (NFP) item comprises a plurality of segments. The plurality of segments are registered as a plurality of non-fungible tokens on the blockchain. A segment of the plurality of segments comprises an unplanned pattern to provide high security against counterfeiting. The authentication device, via the artificial intelligence unit, matches the segment with the digital form and determines a location, a position, a shape, a size, and a color of the segment.

In another aspect, the system adds the use of blockchain and non-fungible space. The digital file is registered as a non-fungible token, as an NFT. The digital file will reside on the blockchain. The blockchain is a distributed database with the advantage and benefit that once a record is created, no one has administrator access to go in and manipulate that record. The blockchain is permanent and secure and therefore, the record is also permanent and secure. The uniqueness is captured in a secure way with the identifiers. The physical item has that uniqueness, and it cannot be duplicated or counterfeited. The item is irrefutably verified as authentic.

With this authentication component and blockchain, traditional methods of capturing uniqueness can be used, such as working with third party grading and authentication services like Certified Collectibles Group. Items that go through the grading process are encapsulated and the uniqueness is captured in their regular database. The third party grading and authentication services verifies authenticity and provides certification (i.e., NFP certified). The blockchain and non-fungible space may be used for enabling mutual authentication between the non-fungible physical (NFP) item and the digital form (e.g., NFT).

Figure 8:
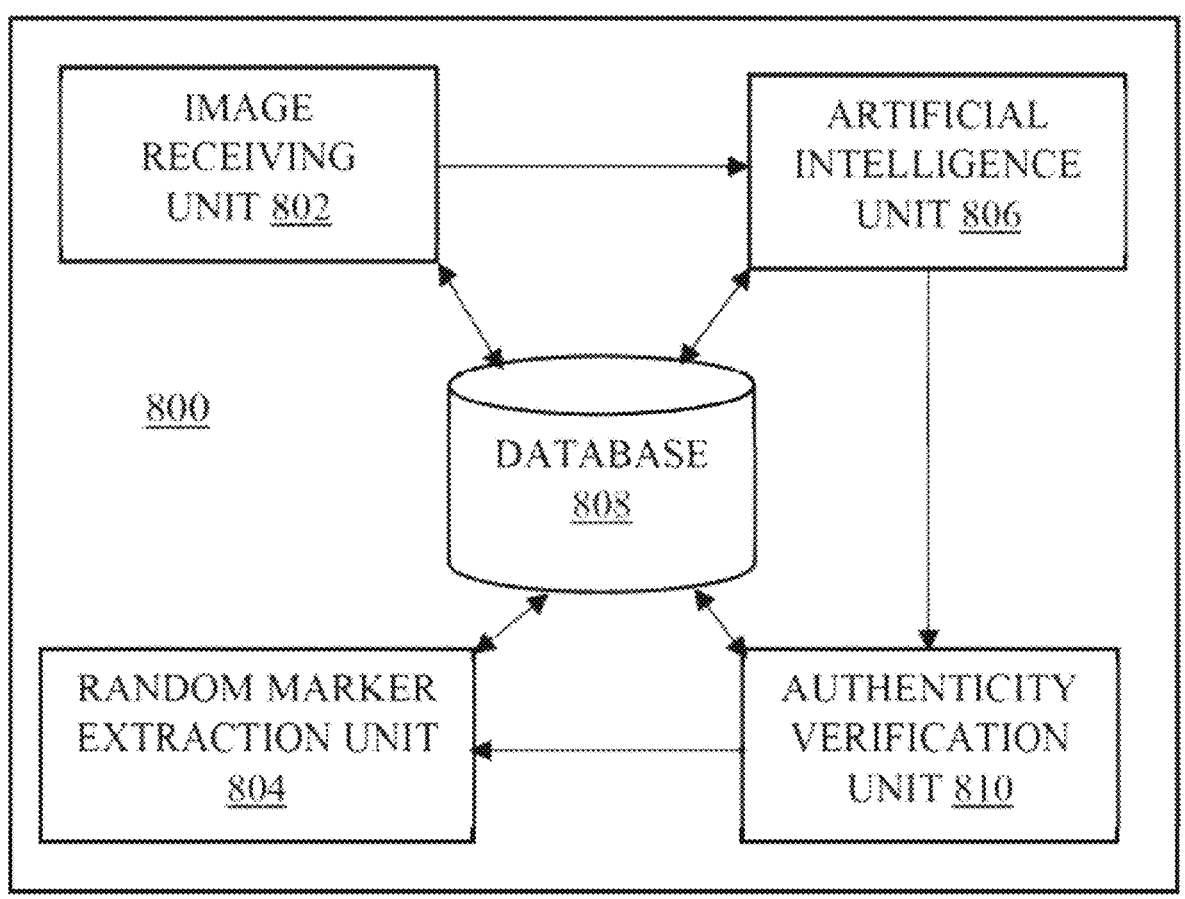
FIG. 8 illustrates an authentication system, according to one or more embodiments.

As an example, FIG. 8 illustrates an authentication system, according to one or more embodiments. The authentication system may reside either in an authentication device (e.g., mobile phone) or a server. The authentication system is capable of verifying the authenticity of the non-fungible physical item and a digital form of the non-fungible physical item. The authentication system is capable of verifying the authenticity of the non-fungible physical item and a digital form of the non-fungible physical item, offline. The authentication system is also capable of verifying the authenticity of the non-fungible physical item and a digital form of the non-fungible physical item online through a connection established (e.g., internet). In this embodiment, the authentication system may reside in the server. The authentication system 800 comprises an image receiving unit 802; an identifier extraction unit 804; an artificial intelligence unit 806; a database 808, and an authenticity verification unit 810.

The image receiving unit 802 receives the image of the non-fungible physical item. In an embodiment, the image receiving unit receives the image of the non-fungible physical item from a camera of an external device. The image may be a three-dimensional image or a two dimensional image. The identifier extraction unit 804 extracts the identifier from the non-fungible physical item. The identifier extraction unit 804 may extract the identifier layers (that are within the multi-layered item of the non-fungible physical item) from the image. The artificial intelligence unit 806 analyzes the image and learns the layers or components (e.g., random maker and/or unique marker, layers, materials, metals, etc.) within the image of the non-fungible physical item.

The artificial intelligence unit 806 may comprise a machine learning unit. The machine learning unit learns the combination of the identifiers and their unplanned pattern information of the NFP item. The database stores the digital file. The digital file comprises the digital form of the NFP item. The digital file further comprises a first unplanned pattern information of the digital form of the non-fungible physical (NFP) item. The first unplanned pattern information comprises a location, a position, a shape, a size, a color, a pattern, a reference point, and a dimension of the identifier with respect to the non-fungible physical (NFP) item.

The authenticity verification unit 810 compares the unplanned pattern information of the NFP item with the first unplanned pattern information of the digital form. The authenticity verification unit 810 verifies authenticity of the NFP item and the digital form (i.e., NFT) based on the comparison. The artificial intelligence unit 806 determines individual varied degree of security level of the non-fungible physical (NFP) item over a course of time. In an embodiment, the artificial intelligence unit 806 provides a grading to the non-fungible physical (NFP) item based on the individual varied degree of security level and the authenticity verified via the artificial intelligence unit 806.

In an embodiment, the artificial intelligence unit 806 is configured to split the digital form into a plurality of segments. Each segment of the plurality of segments comprises an unplanned pattern which makes each segment unique and provides high security against counterfeiting. Each segment of the plurality of segments can function as NFT and be sold or transferred. The plurality of segments enables fractional ownership. In another embodiment, the artificial intelligence unit matches the segment with the digital form and determines a location, a position, a shape, a size, and a color of the segment.

Figure 9:
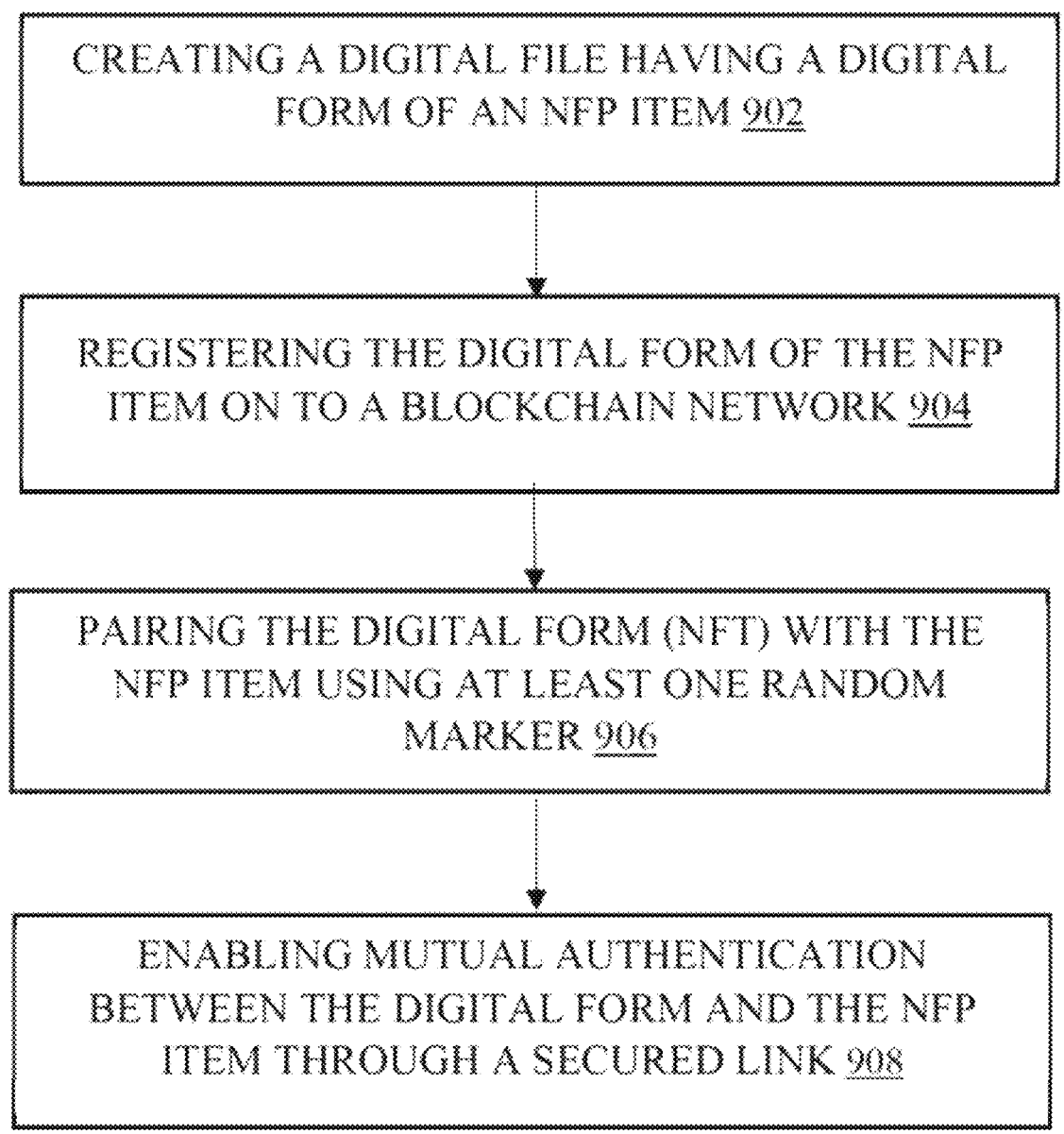
FIG. 9 illustrates creation of a digital file and pairing the digital file to the NFP item, according to one or more embodiments.

As an example, FIG. 9 illustrates creation of a digital file and pairs the digital file to the NFP item, according to one or more embodiments. The method comprises:

Step 902, creating a digital file having a digital form of the NFP item. The digital file is created by capturing random uniqueness of the NFP item in a digital form in a digital file.

Step 904: registering the digital form of the NFP item on to a blockchain network Step 906: pairing the digital form (i.e., NFT) with the NFP item using at least one random and/or unique marker (e.g., unique serial identification (ID) number) through a secured link Step 908: enabling mutual authentication between the digital form and the NFP item through the secured link In an embodiment, the digital file is registered with a third-party grading and authentication service. The digital file is used as a reference to authenticate, determine condition, and provenance of the non-fungible physical (NFP) item and vice versa in future. The non-fungible physical (NFP) item is paired with the non-fungible token (NFT) using the identifier through a secured link. The secured link is adapted to mutually authenticate between the non-fungible physical (NFP) item and the non-fungible token (NFT) by using either one as reference.

In an aspect, a method is described. The method comprises embedding and layering an identifier within a non-fungible physical item in an unplanned pattern. The identifier in the unplanned pattern is configured to provide high security against counterfeiting of the non-fungible physical (NFP) item.

In an embodiment, embedding and layering the identifier within the non-fungible physical item in the unplanned pattern comprises: infusing a metal into an intaglio border of a first portion of the non-fungible physical item. In another embodiment, infusing the metal into the intaglio border of the first portion of the non-fungible physical item comprises: embedding at least one of a negative and a positive microtext into the intaglio border.

In an embodiment, embedding and layering the identifier within the non-fungible physical item in the unplanned pattern comprises: embedding a holographic foil comprising a variable edge into a second portion of the non-fungible physical item. The holographic foil comprises a plurality of security features. The plurality of security features comprises at least one of a guilloche fine line, a morphing effect, a flip image, a laser-viewable image, a micro image, a lens effect, an intentional error, a micro text, and a nano text.

In another embodiment, embedding and layering the identifier within the non-fungible physical item in the unplanned pattern comprises: embedding a watermark into a front side and a back side of the non-fungible physical item.

In yet another embodiment, embedding and layering the identifier within the non-fungible physical item in the unplanned pattern comprises: randomly dispersing a plurality of fibers in the unplanned pattern in the non-fungible physical item. The plurality of fibers comprises at least one of visible fibers and non-visible fibers.

In yet another embodiment, embedding and layering the identifier within the non-fungible physical item in the unplanned pattern comprises: embedding an authentication feature into a multi-layered item of the non-fungible physical item.

In yet another embodiment, embedding and layering the identifier within the non-fungible physical item in the unplanned pattern comprises: embedding a multi-color offset into a multi-layered item of the non-fungible physical item.

In yet another embodiment, embedding and layering the identifier within the non-fungible physical item in the unplanned pattern comprises: printing a unique serial identification (ID) number within a floating frame of the non-fungible physical item.

In yet another embodiment, the method further comprises: capturing a random uniqueness of the non-fungible physical item in a digital file, wherein the digital file comprises a digital form of the non-fungible physical item; and registering the digital form of the non-fungible physical item as a non-fungible token (NFT) onto a blockchain.

In yet another embodiment, the method further comprises: pairing the non-fungible physical (NFP) item with the non-fungible token (NFT) using the identifier through a secured link. In yet another embodiment, the method further comprises: mutually authenticating between the non-fungible physical (NFP) item and the non-fungible token (NFT).

In yet another embodiment, the method further comprises: verifying authenticity of the non-fungible physical (NFP) item using an authentication device. In yet another embodiment, verifying the authenticity of the non-fungible physical (NFP) item using the authentication device comprises: scanning an image of the non-fungible physical (NFP) item; extracting, via an artificial intelligence unit, a second unplanned pattern information of the identifier; comparing the second unplanned pattern information with a first unplanned pattern information of the digital form; and verifying, via the artificial intelligence unit, the authenticity of the non-fungible physical (NFP) item based on the comparison.

In yet another embodiment, the method further comprises: determining individual varied degree of security level of the non-fungible physical (NFP) item over a course of time based on the comparison; and provide a grading to the non-fungible physical (NFP) item based on the individual varied degree of security level and the authenticity verified via the artificial intelligence unit.

In yet another embodiment, the method further comprises: defining and enforcing rules with respect to a smart contract on a blockchain for one of licensing and sale of the NFP item and NFT.

In yet another embodiment, the method further comprises: manufacturing the NFP item comprising a predefined thickness adapted for performing a digital printing on the non-fungible physical (NFP) item. Digital printing on the non-fungible physical (NFP) item creates an art of work on a different medium.

In yet another embodiment, the method further comprises: retrofitting the non-fungible physical (NFP) item to a fungible item to convert the fungible item to a non-fungible item, wherein the non-fungible item comprises a combination of at least one of a label, a holder, and the fungible item.

In yet another embodiment, the method further comprises: segmenting the digital form of the non-fungible physical (NFP) item into a plurality of segments; and registering the plurality of segments as a plurality of non-fungible tokens on the blockchain, wherein a segment of the plurality of segments comprises the unplanned pattern to provide high security against counterfeiting.

In yet another embodiment, the method further comprises: segmenting the non-fungible physical (NFP) item into a plurality of zones during the manufacturing, wherein a zone of the plurality of zones comprises the unplanned pattern to provide high security against counterfeiting.

In yet another embodiment, embedding and layering the identifier within the non-fungible physical item in the unplanned pattern comprises: arranging the identifier with respect to a unique characteristic comprising at least one of a size, a color, a glow, a position, a fluorescence, a shape, or a multi-dimensional aspect to identify the non-fungible physical (NFP) item as unique and authentic against counterfeiting, wherein the identifier comprises at least one of a random, a visible, an invisible, and a machine-readable marker identified based on the arrangement.

In yet another embodiment, embedding and layering the identifier within the non-fungible physical item in the unplanned pattern comprises: dispersal of the identifier with respect to a unique characteristic comprising at least one of a size, a color, a glow, a position, a fluorescence, a shape, and a multi-dimensional aspect to identify the non-fungible physical (NFP) item as unique and to provide high security against counterfeiting, wherein the identifier comprises at least one of a random, a visible, an invisible, and a machine-readable marker identified based on the dispersal.

In yet another embodiment, embedding and layering the identifier within the non-fungible physical item in the unplanned pattern comprises: capturing the identifier in one of a base and a composite material of the non-fungible physical item during conversion of a raw material to an end product while manufacturing the non-fungible physical item.

In yet another embodiment, embedding and layering the identifier within the non-fungible physical item in the unplanned pattern comprises: performing tampography using at least one of an ink and a coating to stamp a three-dimensional (3D) object with the identifier in the non-fungible physical item.

In yet another embodiment, the method further comprises: establishing a rating scale for risk assessment of counterfeiting, providing certification, providing a numerical rating; and verifying authenticity using the rating scale for risk assessment of counterfeiting and providing the numerical rating.

In yet another embodiment, the method further comprises: creating at least one of a holder, and a label for an item post-manufacture; replacing an existing label and an existing holder with the holder and the label respectively to provide high security against counterfeiting, wherein at least one of the holder and the label comprises the identifier in the unplanned pattern. The holder comprises an NFP enabled and NFP certified holder. The label comprise an NFP enabled and NFP certified label.

In yet another embodiment, embedding and layering the identifier within the non-fungible physical item in the unplanned pattern comprises: embedding matter with a naturally occurring random and/or unique marker to provide high security against counterfeiting.

In yet another embodiment, embedding matter with a naturally occurring random and/or unique marker comprises: embedding diamond in a coin.

In yet another embodiment, embedding and layering the identifier within the non-fungible physical item in the unplanned pattern comprises: embedding a naturally occurring random and/or unique marker and creating an imperfection in a material in the non-fungible physical item.

In yet another embodiment, the method further comprises: registering the non-fungible physical item as a non-fungible digital token, wherein the NFT comprising a combination of the naturally occurring random and/or unique marker, and the imperfection in the material provides high security against counterfeiting.

In yet another aspect, a non-transitory storage medium is described. The non-transitory storage medium storing a sequence of instructions, which when executed by a processor causes: capturing a random uniqueness of a non-fungible physical item in a digital file of, wherein the digital file comprises a digital form of the non-fungible physical item; and registering the digital form of the non-fungible physical item as a non-fungible token (NFT) onto a blockchain.

In an embodiment, a non-transitory storage medium further causes: pairing the non-fungible physical (NFP) item with the non-fungible token (NFT) using an identifier through a secured link. The non-transitory storage medium further causes: enabling mutual authentication between the non-fungible physical (NFP) item and the non-fungible token (NFT). In yet another embodiment, the non-transitory storage medium further causes: verifying authenticity of the non-fungible physical (NFP) item using an authentication device.

In yet another embodiment, verifying the authenticity of the non-fungible physical (NFP) item using the authentication device causes: scanning an image of the non-fungible physical (NFP) item; extracting, via an artificial intelligence unit, a second unplanned pattern information of the identifier; comparing the second unplanned pattern information with a first unplanned pattern information of the digital form; and verifying, via the artificial intelligence unit, the authenticity of the non-fungible physical (NFP) item based on the comparison.

In yet another embodiment, the non-transitory storage medium further causes: determining individual varied degree of security level of the non-fungible physical (NFP) item over a course of time based on the comparison; and providing a grading to the non-fungible physical (NFP) item using a rating scale based on the individual varied degree of security level and the authenticity verified via the artificial intelligence unit.

In yet another embodiment, the non-transitory storage medium further causes: segmenting the digital form of the non-fungible physical (NFP) item into a plurality of segments; and registering the plurality of segments as a plurality of non-fungible tokens on the blockchain. The segment of the plurality of segments comprises an unplanned pattern to provide high security against counterfeiting.

The foregoing disclosure provides illustration and description but is not intended to be exhaustive or to limit the implementations to the precise form disclosed. Modifications and variations are possible in light of the above disclosure or may be acquired from practice of the implementations.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. The invention may also be practiced in distributed system environments where local and remote computer systems, which are linked (either by hardwired data links, wireless data links, or by a combination of hardwired and wireless data links) through a network, both (local and remote computer systems) perform tasks. In a distributed system environment, program modules or units may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

What is claimed is:

1. A method for forming, authenticating and securing non-fungible item, comprising:
    embedding identification marks, stochastically dispersed within at least a portion of a three dimensional (3D) structure of the physical item, to form a non-fungible physical (NFP) item, wherein unplanned characteristics of spatial properties of the identification marks, which are distinct and discernible from material surrounding the unplanned characteristics, have an infinitesimal probability of replication, wherein the identification marks are permanently fixed and unalterable without damaging the item, and whereby integration of the unplanned characteristics makes it virtually impossible to circumvent the embedding process or create a duplicate item with matching identification marks that would remain undetected during a comparison between the duplicate item and reference data relating to the NFP item;
    capturing and securely registering a digital representation of the unplanned characteristics of the spatial properties of the identification marks embedded within the NFP item;
    creating a digital record of ownership that securely links the spatial properties of the identification marks between the NFP item and its corresponding digital representation, and
    employing at least one of artificial intelligence (AI) and other suitable processing technology to compare spatial properties of identification marks embedded within a suspect NFP item to the digital representation of the NFP item, irrefutably determining authenticity of the suspect NFP item and preventing duplication of the NFP item.

2. The method of claim 1, further comprising:
    capturing at least one of an image and a video of the physical item; and
    associating at least a portion of the at least one of the image and the video of the physical item with the securely registered digital representation.

3. The method of claim 2, wherein the at least one of the image and the video serves as a reference point.

4. The method of claim 3, wherein the reference point captures the characteristics of the item in the fourth dimension (4D), accounting for its changes over time.

5. The method of claim 1,
    adding a security feature to the digital record of ownership, wherein the security feature comprises at least one of a holographic foil, a watermark, an unique serial identification (ID) number, a guilloche fine line, a morphing effect, a flip image, a laser-viewable image, a micro image, a lens effect, a micro text, a nano text, a hardware token, a chemical sensitivity, a taggant, a password, a biometric, a verification code, a card security code, an intaglio border, an intentional error, a near-field communication (NFC) device, a QR code, a bar code, a radio frequency identification (RFID), an overt feature, a covert feature, a machine readable feature and a combination thereof.

6. The method of claim 1, wherein the NFP comprises at least one of a high-value item, a collectible, a payment card, a banknote, an automotive part, a computer part, a passport, a pharmaceutical item, a legal document, a credit card, an accessory, an apparel, a work of art, an access control card, an identification card, an electronics component, a label, a holder, an encapsulating material, an access card, a smart card, a limited edition item, a vital record, and an aircraft part.

7. The method of claim 1, wherein the secure registry comprises a distributed ledger technology (DLT) platform with a smart contract functionality.

8. The method of claim 7, wherein the digital representation is registered on a blockchain as a Non-Fungible Token (NFT).

9. The method of claim 8, wherein securely linking the spatial properties of the identification marks between the NFP item and its corresponding NFT enables sharing features of at least one of provenance tracking, royalties on sale, marketing, and licensing.

10. The method of claim 5, wherein adding the security feature comprises creating an additional random process to create additional random characteristics to enable authentication.

11. The method of claim 8, further comprising:
enabling mutual authentication, wherein the spatial properties of the identification marks embedded within an NFP item are operable to determine authenticity of the NFT.

* * * * *